US011556486B2

(12) United States Patent
Prasad et al.

(10) Patent No.: US 11,556,486 B2
(45) Date of Patent: Jan. 17, 2023

(54) VERSATILE CONTROL MESSAGING SCHEME FOR RADIO COEXISTENCE MANAGEMENT

(71) Applicant: QUALCOMM Incorporated, San Diego, CA (US)

(72) Inventors: Mohit Kishore Prasad, San Diego, CA (US); Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/920,150

(22) Filed: Jul. 2, 2020

(65) Prior Publication Data

US 2022/0004513 A1 Jan. 6, 2022

(51) Int. Cl.
*G06F 13/362* (2006.01)
*G06F 13/42* (2006.01)

(52) U.S. Cl.
CPC ...... *G06F 13/3625* (2013.01); *G06F 13/4282* (2013.01)

(58) Field of Classification Search
CPC ......................... G06F 13/3625; G06F 13/4282
See application file for complete search history.

(56) References Cited

U.S. PATENT DOCUMENTS

2005/0064842 A1* 3/2005 Patel ...................... H04B 15/02 455/345
2005/0141565 A1* 6/2005 Forest .................. H03M 13/43 370/503
2009/0141744 A1* 6/2009 Poledna ........... H04L 12/40026 370/503
2010/0115167 A1* 5/2010 Tardieux .............. G06F 13/362 710/240
2014/0032804 A1* 1/2014 Nixon .................. G06F 13/372 710/124
2014/0281076 A1* 9/2014 Breece, III .......... G06F 13/4072 710/106
2016/0147684 A1* 5/2016 Sengoku .................. G06F 1/14 710/105
2018/0157286 A1* 6/2018 Quiet .................... G06F 13/362
2018/0307263 A1* 10/2018 Mukker .................... G06F 1/12
2018/0357199 A1* 12/2018 Mishra ................ G06F 13/4004
2019/0129881 A1* 5/2019 Wietfeldt ................ G06F 9/542
2020/0242066 A1* 7/2020 Lee ........................ G06F 13/24

* cited by examiner

*Primary Examiner* — Henry Tsai
*Assistant Examiner* — Harry Z Wang
(74) *Attorney, Agent, or Firm* — Qualcomm Incorporated

(57) ABSTRACT

An apparatus includes an interface circuit adapted to couple the apparatus to a serial bus, a slot counter, and a processor. The slot counter may be configured to monitor a radio frequency coexistence management cycle that includes a plurality of time slots. The processor may be configured to transmit a first datagram through the interface circuit during a first time slot in the plurality of time slots. The apparatus may be uniquely permitted to initiate transactions over the serial bus during the first time slot. The processor may be further configured to participate in an arbitration procedure during a second time slot in the plurality of time slots. More than one device coupled to the serial bus may be permitted to initiate transactions in the second time slot.

30 Claims, 19 Drawing Sheets

600
SDATA (602)
SCLK (604)
606
612
614
618
616
BP
1
C
A
BP
Slave Arbitration (608)
1/0
SA3
SA2
SA1
SA0
620
SSC
610
Command Frame
640
642
650
652
654
644
Master Priority Arbitration
656
0
1
2
3
SR
658
Slave Arbitration (646)
660
648

| Payload size (bytes): | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Cycles: | 35 | 44 | 53 | 62 | 71 | 80 | 89 | 98 | 107 | 116 | 125 | 134 | 143 | 152 | 161 | 170 |
| Latency (μs): | 1.35 | 1.69 | 2.04 | 2.38 | 2.73 | 3.08 | 3.42 | 3.77 | 4.12 | 4.46 | 4.81 | 5.15 | 5.50 | 5.85 | 6.19 | 6.54 |

Minimum; 35 cycles (1 Byte payload) Maximum: 170 cycles (16 Byte payload)

VERSATILE CONTROL MESSAGING SCHEME FOR RADIO COEXISTENCE MANAGEMENT

TECHNICAL FIELD

The present disclosure relates generally to serial communication over a shared serial bus and, more particularly, to managing coexistence messaging on a shared bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may be a multi-drop serial bus or a parallel bus. General-purpose serial interfaces known in the industry include the Inter-Integrated Circuit (I2C or I$^2$C) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. SPMI protocols define a hardware interface that may be implemented between baseband or application processors and peripheral components. In some instances, SPMI protocols are implemented to support power management operations within a device.

A multi-drop serial bus may be capable of supporting large numbers of devices that implement increasingly higher-speed, more complex applications, and new protocols are being developed to support such advanced applications. There is a need to provide or maintain low-latency communication capabilities as bus activity increases with new and more complex applications. There is also a need to support legacy devices when new protocols are implemented.

SUMMARY

Certain aspects of the disclosure relate to systems, apparatus, methods and techniques that can enable devices coupled to a multi-drop serial bus, including radio frequency front end devices to exchange coexistence messages over the multidrop bus within the timing constraints associated with higher-speed, high-complexity radio frequency access technologies. According to certain aspects, existing bus protocols can be leveraged to meet latency requirements and to enable devices to timely exchange coexistence information. The bus may be operated in a manner that is compatible or compliant with an SPMI protocol, an RFFE protocol or another protocol usable on a serial bus.

In various aspects of the disclosure, a method performed at a first device coupled to a serial bus includes monitoring a coexistence management cycle that includes a plurality of time slots, transmitting a first datagram over the serial bus during a first time slot in the plurality of time slots, where the first device is uniquely permitted to initiate transactions over the serial bus during the first time slot, and participating in an arbitration procedure during a second time slot in the plurality of time slots. More than one device coupled to the serial bus may be permitted to initiate transactions during the second time slot. The first datagram may include a payload of coexistence management information.

In various aspects of the disclosure, an apparatus implementing the first device has an interface circuit adapted to couple the apparatus to a serial bus, a slot counter configured to monitor a coexistence management cycle that includes a plurality of time slots, and a processor. The processor may be configured to transmit a first datagram through the interface circuit during a first time slot in the plurality of time slots, and participate in an arbitration procedure during a second time slot in the plurality of time slots. The apparatus is uniquely permitted to initiate transactions over the serial bus during the first time slot. More than one device coupled to the serial bus may be permitted to initiate transactions in the second time slot.

In various aspects of the disclosure, an apparatus implementing the first device includes means for monitoring a coexistence management cycle that includes a plurality of time slots, means for transmitting a first datagram over the serial bus during a first time slot in the plurality of time slots, and means for participating in an arbitration procedure during a second time slot in the plurality of time slots. The first device is uniquely permitted to initiate transactions over the serial bus during the first time slot. More than one device coupled to the serial bus may be permitted to initiate transactions during the second time slot.

In various aspects of the disclosure, a processor-readable storage medium stores code for monitoring a coexistence management cycle that includes a plurality of time slots, transmitting a first datagram over the serial bus during a first time slot in the plurality of time slots, where the first device is uniquely permitted to initiate transactions over the serial bus during the first time slot, and participating in an arbitration procedure during a second time slot in the plurality of time slots. More than one device coupled to the serial bus may be permitted to initiate transactions during the second time slot. The first datagram may include a payload of coexistence management information.

In one aspect, the duration of each time slot in the plurality of time slots is defined by cycle time of a clock signal received independently of the serial bus. Each time slot may repeat at a rate defined by the number of time slots included in the coexistence management cycle.

In certain aspects, a clock signal is received independently of the serial bus. The clock signal may define timing of a plurality of cycles in the coexistence management cycle. The clock signal may be a real time clock signal or a sleep clock signal coupled to each device that is coupled to the serial bus.

In one aspect, a second datagram is received in a third time slot in the plurality of time slots, and a transmitter of the second datagram is identified based on position of the third time slot within the coexistence management cycle.

In certain aspects, the first device maintains slot information associating one or more time slots within the coexistence management cycle with identifiers of each device uniquely permitted to initiate transactions over the serial bus during one of the one or more time slots. The slot information may be maintained from a master device while the coexistence management cycle is disabled. A start command may be received from the master device that initiates the coexistence management cycle. Monitoring of the coexistence management cycle may be commenced after the start command is received. The slot information may associate the one or more slots within the coexistence management cycle with information characterizing radio frequency interfaces in each device uniquely permitted to initiate transactions over the serial bus during the one or more slots.

In various aspects of the disclosure, a method performed at a transmitting device coupled to a serial bus includes assigning a plurality of time slots in a coexistence management cycle to a plurality of devices coupled to the serial bus such that each of the plurality of devices is uniquely permitted to initiate transactions over the serial bus during one of the plurality of time slots, transmitting a first command over the serial bus, the first command being configured to cause a coexistence management cycle monitoring circuit to be reset in each of the plurality of devices, configuring each of the plurality of devices with slot information associating the plurality of time slots with identifiers of devices uniquely permitted to initiate transactions over the serial bus during assigned time slots, and transmitting a second command over the serial bus, the second command being configured to cause the coexistence management cycle monitoring circuit to be initiated in each of the plurality of devices.

In various aspects of the disclosure, an apparatus implementing the transmitting device includes an interface circuit adapted to couple the apparatus to a serial bus, and a processor. The processor may be configured to assign a plurality of time slots in a coexistence management cycle to a plurality of devices coupled to the serial bus such that each of the plurality of devices is uniquely permitted to initiate transactions over the serial bus during one of the plurality of time slots, transmit a first command through the interface circuit, the first command being configured to cause a coexistence management cycle monitoring circuit to be reset in each of the plurality of devices, configure each of the plurality of devices with slot information associating the plurality of time slots with identifiers of devices uniquely permitted to initiate transactions over the serial bus during assigned time slots, and transmit a second command through the interface circuit, the second command being configured to cause the coexistence management cycle monitoring circuit to be initiated in each of the plurality of devices.

In various aspects of the disclosure, a processor-readable storage medium stores code for assigning a plurality of time slots in a coexistence management cycle to a plurality of devices coupled to the serial bus such that each of the plurality of devices is uniquely permitted to initiate transactions over the serial bus during one of the plurality of time slots, transmitting a first command over the serial bus, the first command being configured to cause a coexistence management cycle monitoring circuit to be reset in each of the plurality of devices, configuring each of the plurality of devices with slot information associating the plurality of time slots with identifiers of devices uniquely permitted to initiate transactions over the serial bus during assigned time slots, and transmitting a second command over the serial bus, the second command being configured to cause the coexistence management cycle monitoring circuit to be initiated in each of the plurality of devices.

In various aspects of the disclosure, an apparatus implementing the transmitting device includes means for assigning a plurality of time slots in a coexistence management cycle to a plurality of devices coupled to the serial bus such that each of the plurality of devices is uniquely permitted to initiate transactions over the serial bus during one of the plurality of time slots, means for transmitting a first command over the serial bus, the first command being configured to cause a coexistence management cycle monitoring circuit to be reset in each of the plurality of devices, means for configuring each of the plurality of devices with slot information associating the plurality of time slots with identifiers of devices uniquely permitted to initiate transactions over the serial bus during assigned time slots, and means for transmitting a second command over the serial bus, the second command being configured to cause the coexistence management cycle monitoring circuit to be initiated in each of the plurality of devices.

In one aspect, each time slot in the plurality of time slots has a duration that is defined by the period of a real time clock signal or a sleep clock signal received independently of the serial bus. Each time slot may be repeated at a rate defined by the number of time slots included in the coexistence management cycle. In one aspect, one or more arbitrable time slots may be provided in the coexistence management cycle. More than one device coupled to the serial bus is permitted to initiate transactions during the one or more arbitrable time slots. In one aspect, the slot information associates the one or more slots within the coexistence management cycle with information characterizing radio frequency interfaces in devices that are uniquely permitted to initiate transactions over the serial bus during assigned time slots. In one aspect, each of the plurality of devices is configured to transmit coexistence management information in a corresponding assigned time slot. The coexistence management information may be transmitted in accordance with a SPMI, RFFE or other protocol.

DETAILED DESCRIPTION

Figure 1:
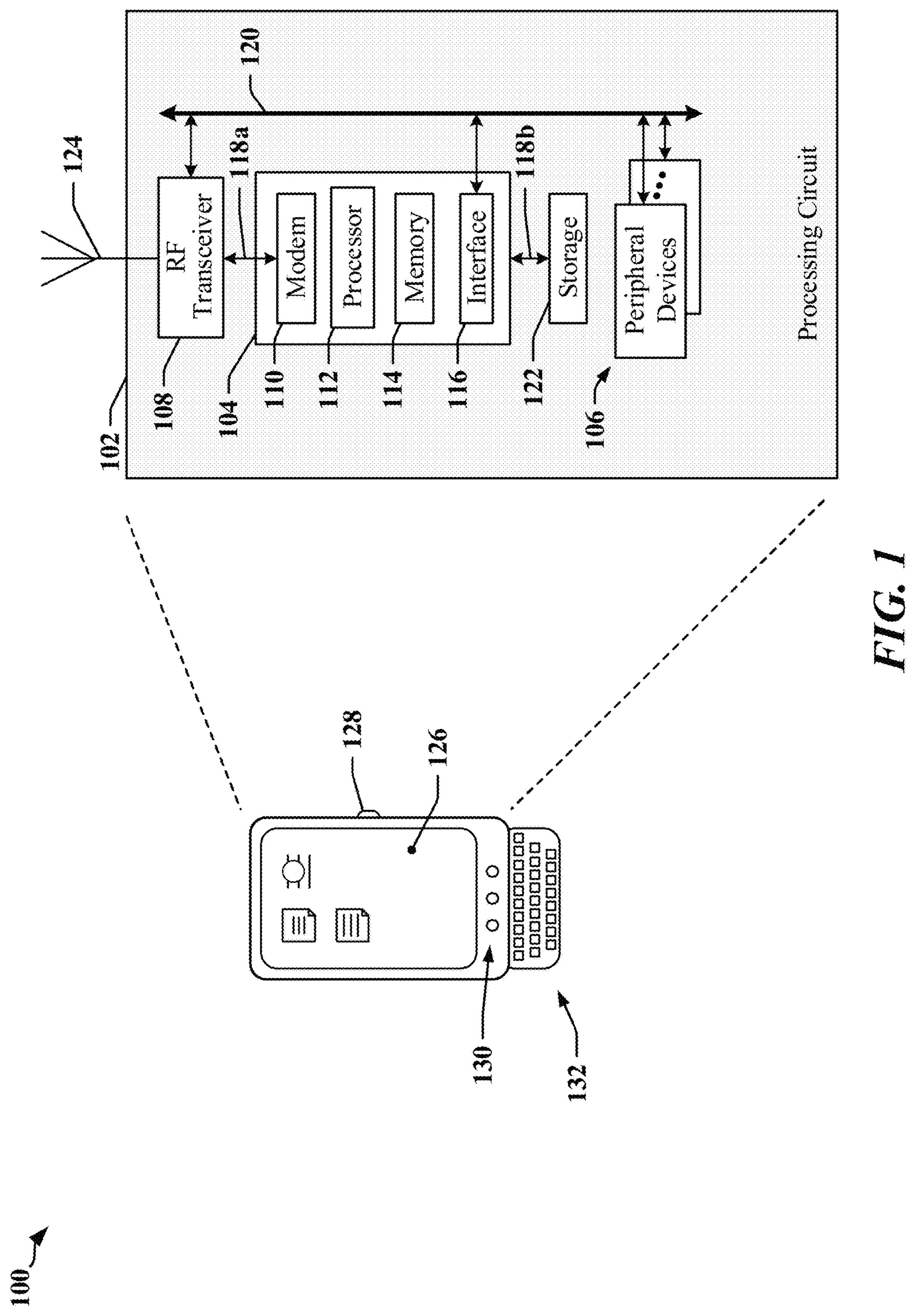
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include SoC and other IC devices often employ a shared communication interface that may include a serial bus or other data communication link to connect different devices. In one example, a multi-drop serial bus may be implemented to interconnect processors with modems and other peripherals. The serial bus and other data communication link may be operated in accordance with multiple standards or protocols defined. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the use of greater numbers of peripherals, radio-frequency front-end devices and/or sensors device in support of complex applications requires updates to existing bus protocols that include new features that were undefined in earlier versions of the bus protocols.

Certain aspects of the disclosure provide a flexible arbitration scheme that can support RF coexistence management using a serial bus that is operated in accordance with SPMI protocols. In one aspect, communication opportunities for coexistence messaging can be guaranteed for all devices sharing the serial bus while meeting the real-time constraints associated with coexistence management. In another aspect, certain techniques are disclosed that enable a receiver to independently determine the identity of a transmitting device without arbitration monitoring. SPMI protocols can remain unchanged when these techniques are implemented. In another aspect, secondary level protocols are defined that can enable an SPMI bus to support RF coexistence needs.

Certain aspects disclosed herein are described with reference to a serial bus operated in accordance with SPMI protocols. However, certain concepts may be equally applicable to RFFE protocols, I3C protocols, I2C protocols, and/or or another bus protocol. Certain aspects are applicable to a serial bus operated in half-duplex mode or full-duplex mode. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118*a*, 118*b*, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
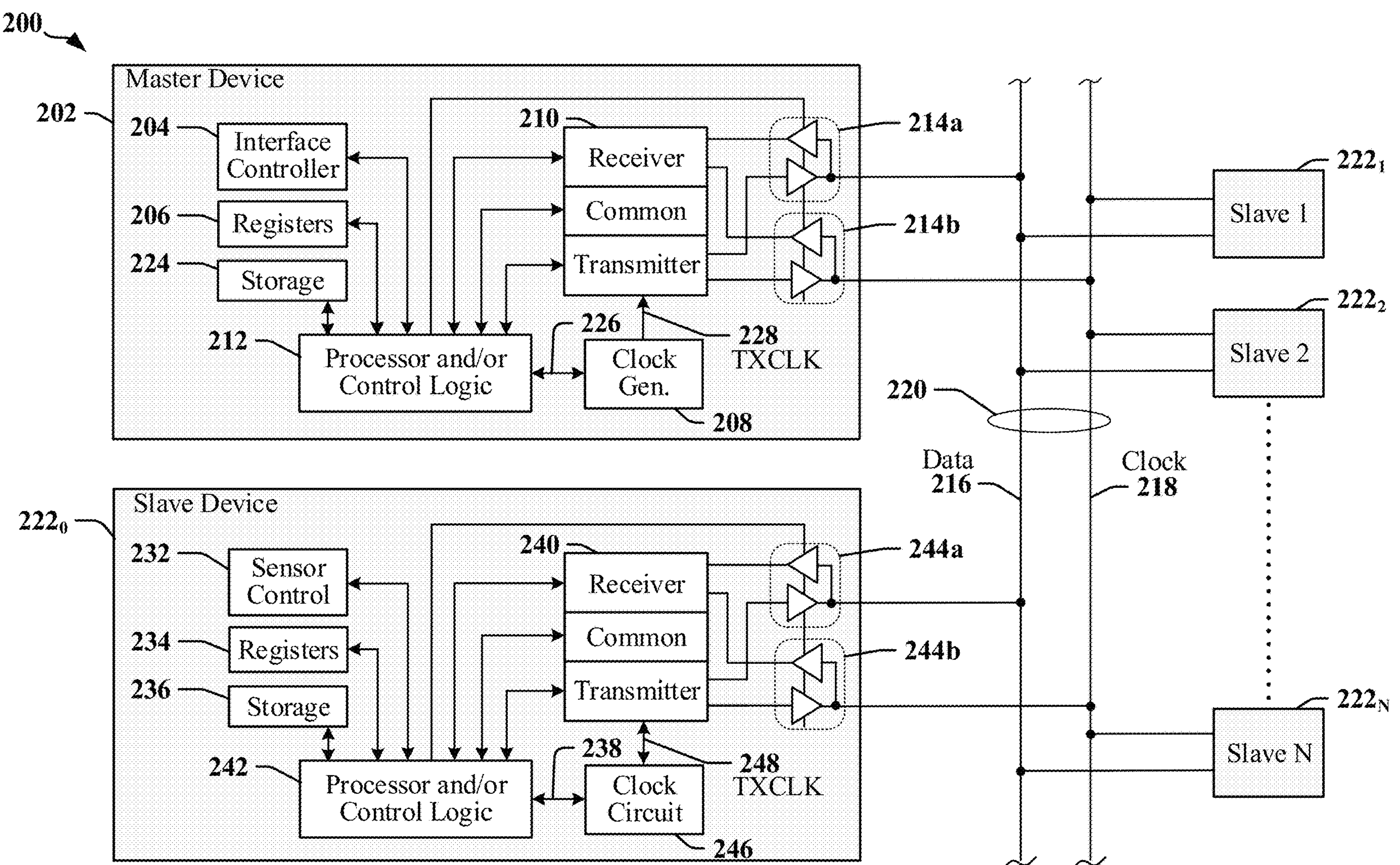
FIG. 2 illustrates a system architecture for an apparatus employing a data link between IC devices.

FIG. 2 illustrates certain aspects of an apparatus 200 that includes multiple devices 202, and $\mathbf{222_0}$-$\mathbf{222_N}$ coupled to a serial bus 220. The devices 202 and $\mathbf{222_0}$-$\mathbf{222_N}$ may be implemented in one or more semiconductor IC devices, such as an application processor, SoC or ASIC. In various implementations the devices 202 and $\mathbf{222_0}$-$\mathbf{222_N}$ may include, support or operate as a modem, a signal processing device, a display driver, a camera, a user interface, a sensor, a sensor controller, a media player, a transceiver, RFFE devices, and/or other such components or devices. In some examples, one or more of the slave devices $\mathbf{222_0}$-$\mathbf{222_N}$ may be used to control, manage or monitor a sensor device. Communication between devices 202 and $\mathbf{222_0}$-$\mathbf{222_N}$ over the serial bus 220 is controlled by a bus master 202. Certain types of bus can support multiple bus masters 202.

In one example, a master device 202 may include an interface controller 204 that manages access to the serial bus, configures dynamic addresses for slave devices $\mathbf{222_0}$-$\mathbf{222_N}$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214*a* and 214*b*. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $\mathbf{222_0}$-$\mathbf{222_N}$ may be configured to operate as a slave device on the serial bus 220 and may include circuits and modules that support a display, an image sensor, and/or circuits and modules that control and communicate with one or more sensors that measure environmental conditions. In one example, a slave device $\mathbf{222_0}$ configured to operate as a slave device may provide a control function, module or circuit 232 that includes circuits and modules to support a display, an image sensor, and/or circuits and modules that control and communicate with one or more sensors that measure environmental conditions. The slave device $\mathbf{222_0}$ may include configuration registers 234 or other storage 236, control logic 242, a transceiver 240 and line drivers/receivers 244*a* and 244*b*. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with an I2C protocol, I3C protocol, RFFE protocol, SPMI protocol, or another protocol. At least one device 202, $\mathbf{222_0}$-$\mathbf{222_N}$ may be configured to selectively operate as either a master device or a slave device on the serial bus 220. Two or more devices 202, $\mathbf{222_0}$-$\mathbf{222_N}$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Wireless communication increasingly involves mobile apparatus that includes more than one antenna and/or more than one radio frequency (RF) modem that enable the apparatus to be concurrently connected to multiple networks. Each modem may be configured for operation in a radio access network (RAN) using a radio access technology (RAT) defined for the RAN. A mobile wireless communication device may be coupled to two or more RANs using two or more RATs. The mobile wireless communication device may include multiple instances of certain device types that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components of the RF modem, an RF transceiver and/or an antenna.

In one example, coexistence management messages may be transmitted between one or more aggressors and/or one or more victims. An aggressor may be an antenna or other source of radiative energy that may interfere with, or affect the operation of another RF component. For example, an aggressor may transmit relatively high-power RF signals at frequencies near to the operating frequency of an RF receiver. The RF receiver may be unable to receive a relatively low-power RF signal of interest due to overwhelming interference. In some instances, sensitive RF components may be damaged by high-power interfering RF signals.

Coexistence management issues continually increase in complexity with the deployment of networks that use constantly evolving cellular radio technologies, including networks used in wireless communication systems that are designed to support high data throughput. For example, the 3rd Generation Partnership Project (3GPP) defines specifications for fourth generation (4G) technologies including the long-term evolution (LTE) and fifth generation new radio (5G NR) technologies that can be expected to provide ever-increasing data bandwidths. The 5G NR specifications and LTE License Assisted Access (LTE-LAA) specifications provide for the use of both licensed and unlicensed spectra for data communication. In one example, frequencies at the 2.4 GHz and 5 GHz unlicensed industrial, scientific, and medical radio bands (ISM band) may be used to provide additional bandwidth. The use of these bands can create coexistence issues with Bluetooth radios (2.4 GHz) and WLAN radios (5 GHz).

Figure 3:
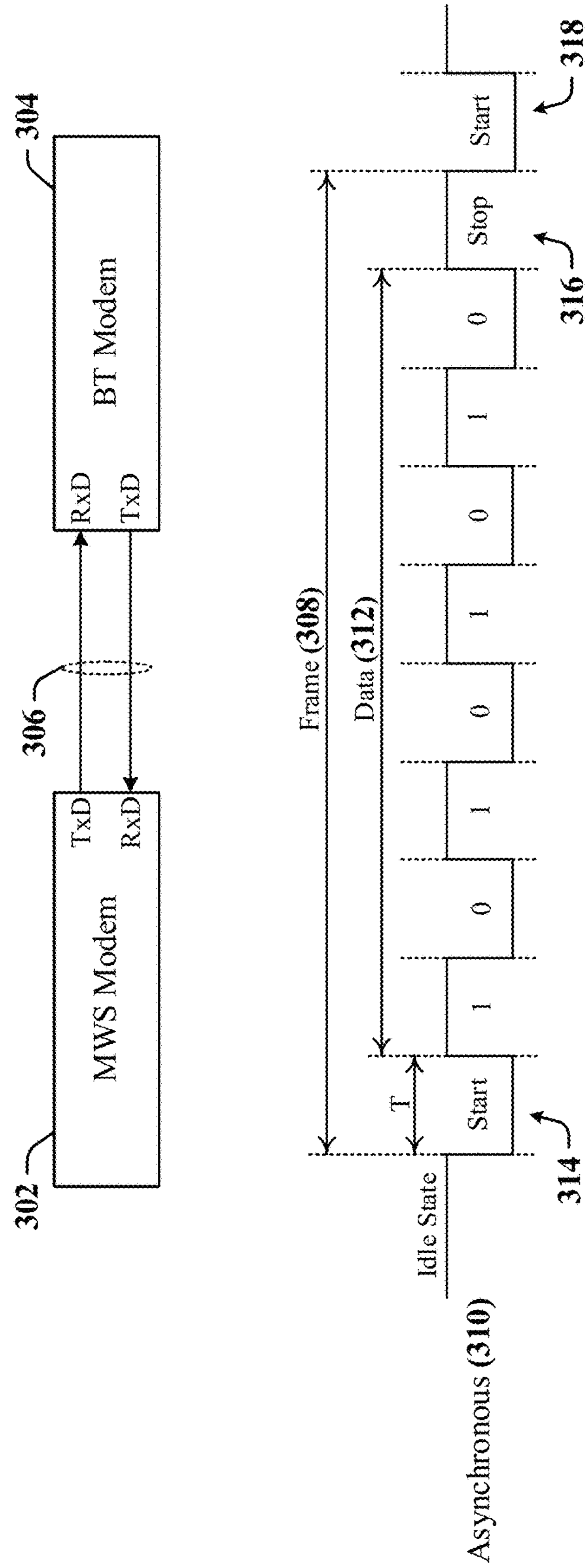
FIG. 3 illustrates an example of a system employing a coexistence management interface that may be adapted in accordance with certain aspects disclosed herein.

FIG. 3 illustrates an example of a conventional coexistence management interface (CxMi) 300 that employs a two-wire, point-to-point, UART-based CxMi link 306. The CxMi link 306 may be operated at 4 Mbps. In the illustrated example, a first modem 302 is configured for operation using a mobile wireless service (MWS) RAT and a second modem 304 is configured for Bluetooth (BT) communications. The modems 302, 304 exchange CxMi messages, commands and/or control information over the CxMi link 306.

In one example, data is clocked on the CxMi link 306 at 4 megabits per second (Mbps). A frame 308 carried in a signal 310 transmitted over the CxMi link 306 includes an 8-bit byte of data 312 that is preceded by a start bit 314 and followed by a stop bit 316, and transmission is accomplished in 10 clock cycles, or 2.5 μs. The frame 308 may be followed immediately by the start bit 318 of a next frame, or by an idle state.

Cellular RATs such as 5G NR may use a wide RF spectrum that can range from sub-GHz to 100 GHz (mmWave) to support a diverse set of application use-cases. Mobile communication devices designed to operate in these RATs typically include multiple built-in radios that can increase the complexity of managing operational coexistence of these radios. For example, coexistence management of these radios demand frequent intercommunication to obtain mutual agreement regarding the use of RF frequencies, power, RF Front-End resources, and so on. Conventional CxMI interfaces 300 that provide point-to-point communication for coexistence management are increasingly insufficient to manage the complexity involved in mobile devices that include multiple radios.

Multiple conventional CxMI interfaces 300 would be needed to enable an aggressor to concurrently notify multiple victims. The large numbers of CxMI links that would be required to cover all of interconnection permutations can render CxMI unusable when multiple aggressors and multiple victims are identified in a mobile wireless communication device. Accordingly, the possibility of using a multi-drop serial bus may be considered to support coexistence in a multi-radio mobile wireless communication device.

Figure 4:
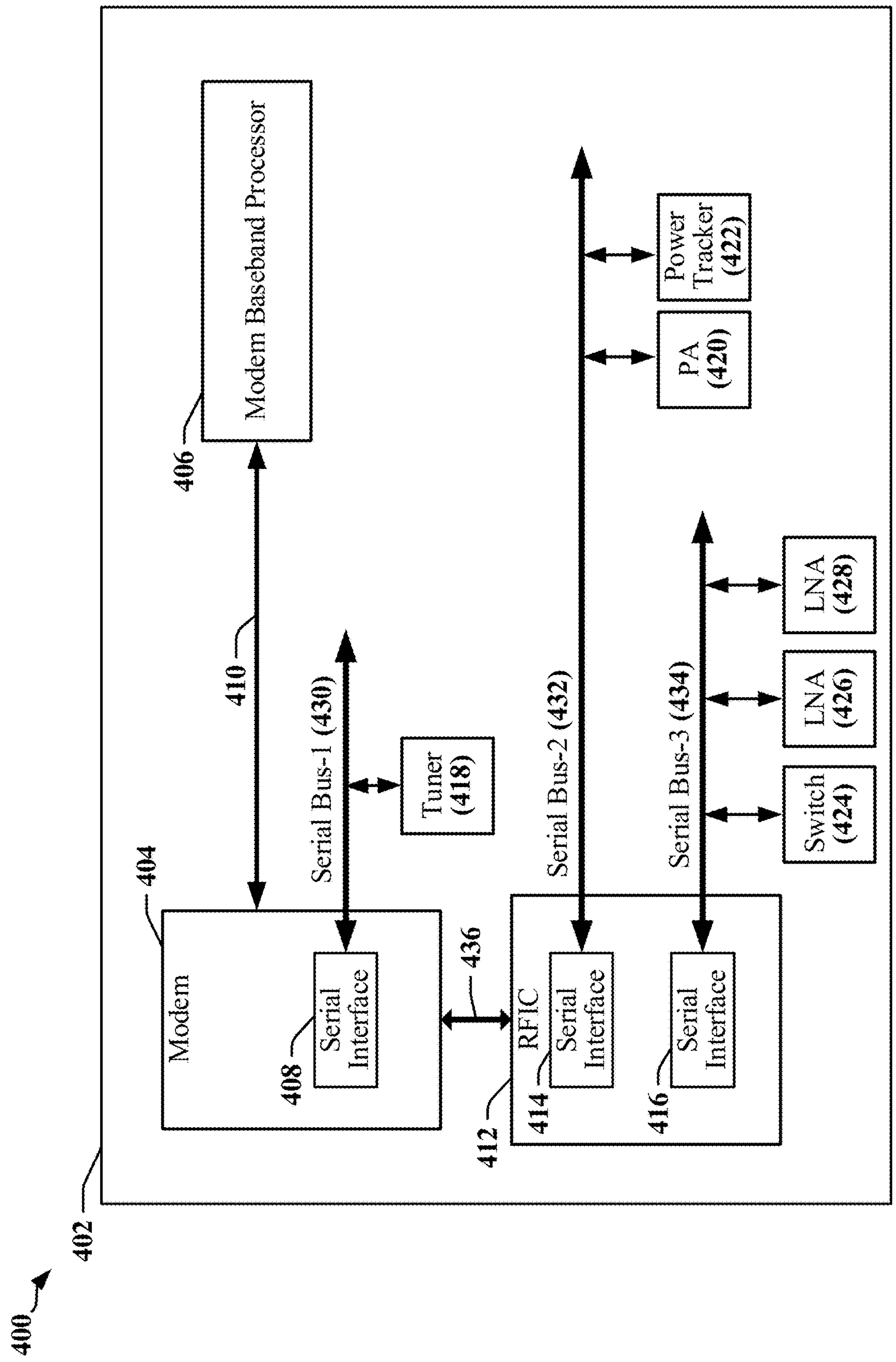
FIG. 4 illustrates a device configuration for coupling various radio frequency front-end devices using multi-drop serial buses.

FIG. 4 is a diagram 400 illustrating a device configuration that may be used for coupling various radio frequency front-end devices using conventional multi-drop serial buses 430, 432, 434 in a chipset or device 402. The multi-drop serial buses 430, 432, 434 may be configured to couple various RF front-end devices 418, 420, 422, 424, 426 428. The multi-drop serial buses 430, 432, 434 may be operated in accordance with an RFFE, SPMI, I3C or other suitable bus protocol. The illustrated device 402 may be embodied in one or more of a mobile communication device, a mobile telephone, a mobile computing system, a notebook computer, a tablet computing device, a media player, a gaming device, a wearable computing and/or communications device, an appliance, or the like.

In various examples, the device 402 may be implemented with one or more baseband processors 406, modems 404, RFICs 412, multiple communications links 410, 436, multiple multi-drop serial buses 430, 432, 434 and/or other types of buses. In the illustrated example, a modem 404 includes a bus interface 408 that couples the modem 404 to a first multi-drop serial bus 430. The modem 404 may communicate with a baseband processor 406 and a Radio-Frequency IC (RFIC 412) through one or more communication links 410, 436. The device 402 may include other processors, circuits, modules and may be configured for various operations and/or different functionalities.

In the example illustrated in FIG. 4, the modem 404 is coupled to an RF tuner 418 through its bus interface 408 and the first multi-drop serial bus 430. The RFIC 412 may include one or more bus interfaces 414, 416, controllers, state machines and/or processors that configure and control certain aspects of the RF front-end. The RFIC 412 may communicate with a PA 420 and a power tracking module 422 through a first of its bus interfaces 414 and the second multi-drop serial bus 432. The RFIC 412 may communicate with a switch 424 and one or more LNAs 426, 428.

In the illustrated example, multiple multi-drop serial buses 430, 432, 434 may be used to support demands for high data throughput, low latency, high bus availability and/or for other reasons. In some instances, multiple serial buses are used to alleviate issues caused by limited addressing capabilities of serial bus protocols. Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol. In certain examples, latency-sensitive messages may include coexistence messages. Bus latency requirements may limit the usability of multi-drop serial buses 430, 432, 434 for exchanging CxMI messages. In this disclosure, the example of SPMI protocols is employed to illustrate certain aspects disclosed herein. However, the concepts disclosed herein are applicable to other serial bus protocols and standards.

Figure 5:
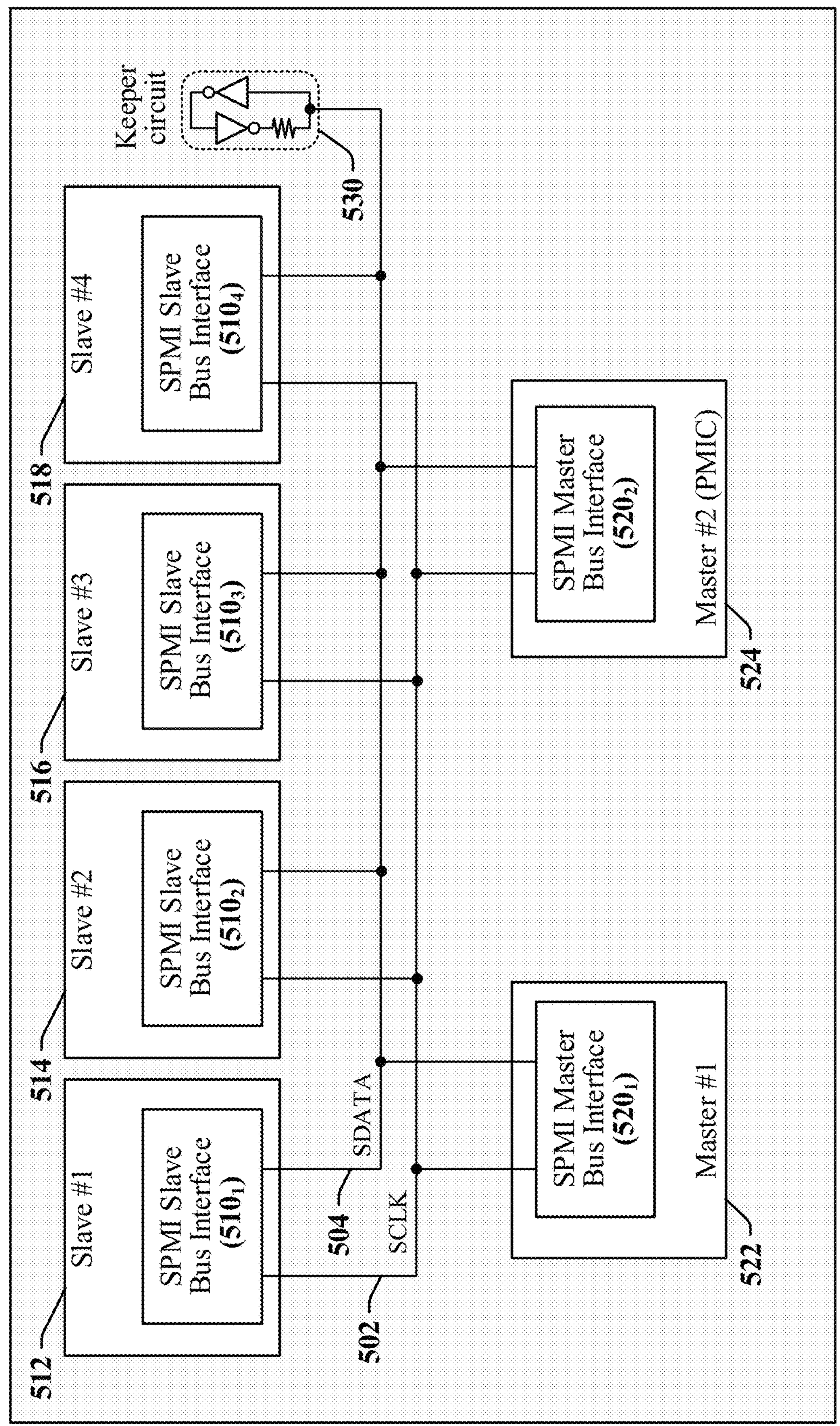
FIG. 5 illustrates an example of a system that includes a serial bus operated in accordance with a SPMI protocol.

Implementations that have used SPMI protocols on a multi-drop bus configured for exchanging CxMI messages have been hindered by certain inherent limitations that can prevent the SPMI multi-drop bus from reliably meeting coexistence requirements. FIG. 5 illustrates an example of a system 500 that includes a serial bus operated in accordance with SPMI bus protocols. In some implementations, SPMI bus protocols are used to implement a general-purpose communication link. In some implementations, SPMI bus protocols are used for power management control, where the bus is configured to support communication of commands used to cause circuits and/or functional components to reset, sleep, shutdown, wakeup, and so on. In the illustrated example, a two-wire serial bus includes a first wire (SCLK 502) that carries a clock signal and a second wire (SDATA 504) that carries a data signal transmitted in accordance with timing defined by the clock signal. The serial bus may connect between one and four master devices 522, 524, and can address up to 16 slave devices 512, 514, 516, 518 on the serial bus at the same time. Application processors, modems, sensors, controllers etc., can be coupled to the serial bus using a slave bus interface $\mathbf{510}_1$-$\mathbf{510}_4$ or a master bus interface $\mathbf{520}_1$-$\mathbf{520}_2$.

During certain operations, SCLK 502 and/or SDATA 504 may be undriven and may be held in a signaling state by keeper circuit 530, or by a pulldown circuit (not shown). In one example, a keeper circuit 530 may be configured as a positive feedback circuit that drives SDATA 504 through a high impedance output, and receives feedback from SDATA 504 through a low impedance input. The keeper circuit 530 may be configured to maintain the last asserted voltage on SDATA 504. The keeper circuit 530 can be easily overcome by a line driver in a slave bus interface $\mathbf{510}_1$-$\mathbf{510}_4$ or a master bus interface $\mathbf{520}_1$-$\mathbf{520}_2$. In some instances, a pulldown circuit or pullup circuit may be used to maintain SCLK 502 and/or SDATA 504 in a desired signaling state. In some implementations, a switch in a pulldown circuit or pullup circuit can be used to couple a pulldown or pullup resistor to a line of the serial bus.

A serial bus operated in accordance with SPMI bus protocols can be used to couple between one and four master devices and up to 16 slave devices. SPMI bus protocols provide address-based bus contention arbitration. A bus arbitration sequence is performed before each transaction to assign control of the serial bus to one master device or to a slave device when multiple devices are requesting access to the serial bus. A master device or slave device may send a command sequence after prevailing at bus arbitration.

Figure 6:
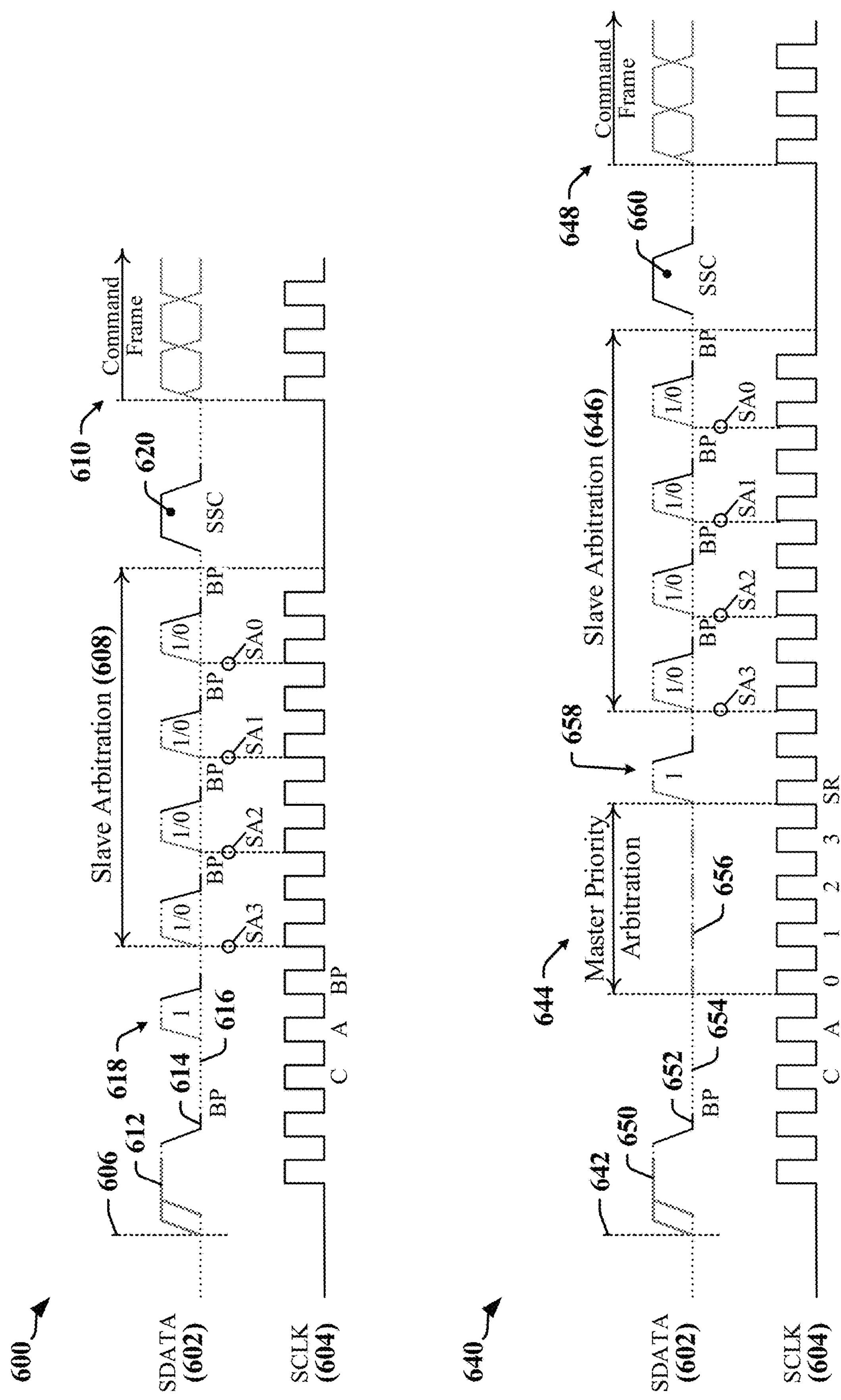
FIG. 6 illustrates certain aspects of bus arbitration procedures defined by SPMI protocols.

FIG. 6 illustrates certain aspects of bus arbitration procedures 600, 640 defined by SPMI protocols. A current bus owner master (BoM) facilitates and monitors bus arbitration requests. A request-capable slave device can participate in arbitration for SPMI bus access using one of the two bus arbitration procedures 600, 640.

The first bus arbitration procedure 600 may be referred to as Alert bit (A-bit) slave arbitration and may be used for priority access requests from request-capable slave devices. A request for access to the serial bus may be initiated at a point in time 606 when the bus is idle. A requesting slave device may drive SDATA 602 to a high signaling state 612 while SCLK 604 is in a low signaling state. The requesting slave device releases SDATA 602 by causing its line driver to enter a high-impedance state. In some implementations, SDATA 602 is held in the high signaling state 612 by a keeper circuit. The BoM may drive SDATA 602 to a low signaling state 614 before releasing SDATA 602 to a high-impedance state 616. The BoM then provides a one clock cycle pulse 618 on SDATA 602 that signals the commencement of the slave arbitration phase 608 of the first bus arbitration procedure 600. Four address-bit slots are provided (SA3-SA0) for slave address arbitration. Each slave device that participates in the first bus arbitration procedure 600 attempts to drive its address during the slave arbitration phase 608, with the slave device having the highest-priority address winning the arbitration. The BoM provides a two-bit sequence start condition (SSC 620) that enables the winning slave device to transmit a command frame 610. The command frame 610 may include a four-bit slave address or other device identifier, and a command code, optionally followed by data.

The second bus arbitration procedure 640 may be referred to as Slave Request bit (SR-bit) slave arbitration and may be used for secondary access requests from request-capable slave devices. A request for access to the serial bus may be initiated at a point in time 642 when the bus is idle. A requesting slave device may drive SDATA 602 to a high signaling state 650 while SCLK 604 is in a low signaling state. The requesting slave device releases SDATA 602 by causing its line driver to enter a high-impedance state. In some implementations, SDATA 602 is held in the high signaling state 650 by a keeper circuit. The BoM may drive SDATA 602 to a low signaling state 652 before releasing SDATA 602 to a high-impedance state 654. Master device priority arbitration 644 follows with four cycles provided to enable each possible master device an opportunity (including opportunity 656) to drive SDATA 602. The BoM then provides a one clock cycle pulse 658 on SDATA 602 that signals the commencement of the slave arbitration phase 646 of the second bus arbitration procedure 640. Four address-bit slots are provided (SA3-SA0) for slave address arbitration. Each slave device that participates in the second bus arbitration procedure 640 attempts to drive its address during the slave arbitration phase 646, and the slave device having the highest-priority address wins the arbitration. The BoM provides a two-bit sequence start condition (SSC 660) that enables the winning slave device to transmit a command frame 648. The command frame 648 may include a four-bit slave address or other device identifier, and a command code, optionally followed by data.

Certain issues limit the use of SPMI protocols for managing a coexistence management interface. For example, the performance of address priority based arbitration prior to each transaction conducted over the serial bus can starve low-priority devices of access to the serial bus and can prevent the serial bus from meeting the real-time constraints of coexistence management. A low-priority device may be starved of access when higher-priority devices consistently prevail in consecutive arbitration procedures, thereby preventing the low-priority device from transmitting coexistence messages within specified maximum latency times.

Figure 7:
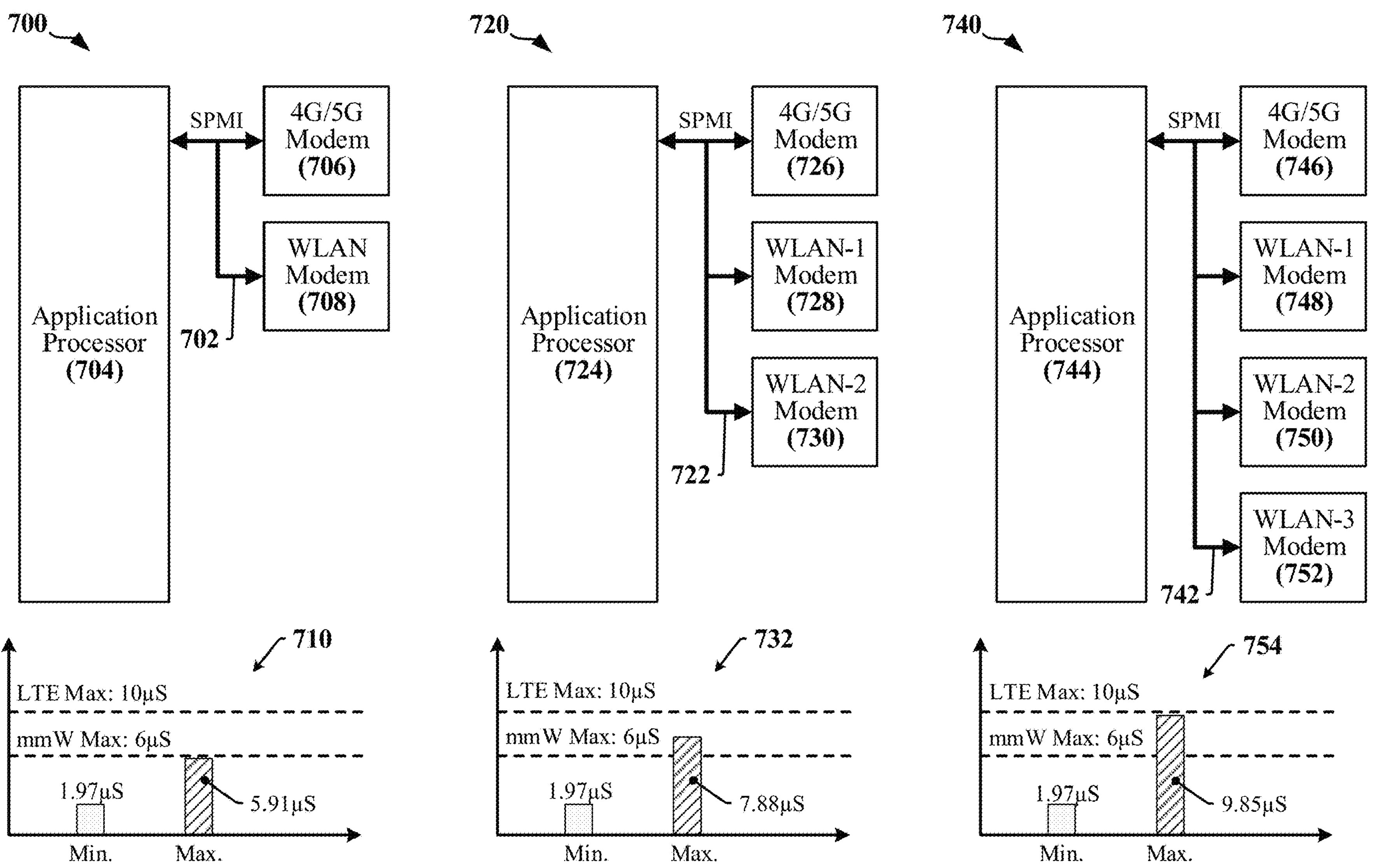
FIG. 7 illustrates the effect of arbitration procedures on latency for low-priority devices when coupled to an SPMI bus.

FIG. 7 illustrates the potential effect of arbitration procedures on latency for low-priority devices when coupled to different SPMI bus configurations 700, 720, 740. The illustrated latency may be defined as the time required to complete transmission of a message over an SPMI bus 702, 722, 742. The minimum latency ($\text{Latency}_{Min}$) for the SPMI bus 702, 722, 742 may be defined as the time required for a device to transmit a message when the SPMI bus 702, 722, 742 is available and no higher-priority device is contending for access to the SPMI bus 702, 722, 742 during address priority based arbitration. $\text{Latency}_{Min}$ may be calculated as the sum of the delay introduced by the interface in a transmitting device, the delay introduced by the interface in a receiving device and the time required to transmit the message over the SPMI bus 702, 722, 742. For example, the transmitting device may be an application processor 704, 724, 744 that has an associated delay ($T_{AP}$), and the receiving device may be a modem 706, 708, 726, 728, 730, 746, 748, 750, 752 that has an associated delay ($T_{SX}$). The time ($T_{Bus}$) required to transmit the message over the SPMI bus 702, 722, 742 includes an arbitration time ($T_{ARB}$) and a message transmission ($T_{TX}$). In certain examples, the minimum latency for each SPMI bus configuration 700, 720, 740 may be calculated as:

$$Latency_{Min}=T_{AP}+T_{Bus}+T_{SX}.$$

In one example, $T_{AP}=T_{AP}=0.12$ µS, $T_{ARB}=0.69$ µS, $T_{TX}=1.04$ µS and thus:

$$Latency_{Min}=0.12\ \mu S+0.69\ \mu S+1.04\ \mu S+0.12\ \mu S=1.97\ \mu S.$$

The maximum latency ($Latency_{Min}$) for the SPMI bus 702, 722, 742 may be defined as the time required for the lowest-priority device to transmit a message when the SPMI bus 702, 722, 742 is available and when all higher-priority devices are contending for access to the SPMI bus 702, 722, 742 during the initial address priority based arbitration. $Latency_{Max}$ may be calculated based on an assumption that no higher-priority device gains access to the SPMI bus 702, 722, 742 through more than one address priority based arbitration before the lowest-priority device gains access to the serial bus. The maximum latency for each SPMI bus configuration 700, 720, 740 may be calculated as:

$$Latency_{Max}=N\times Latency_{Min},$$

where N represents the number of devices coupled to the SPMI bus 702, 722, 742.

The first SPMI bus configuration 700 corresponds to an example where three devices are coupled to the SPMI bus 702, including one application processor 704 and two modems 706, 708. In the first SPMI bus configuration 700, $Latency_{Max}=3\times Latency_{Min}$. In the example where $Latency_{Min}=1.97$ µS, $Latency_{Max}=5.91$ µS.

The second SPMI bus configuration 720 corresponds to an example where four devices coupled to the SPMI bus 722 include one application processor 724 and three modems 726, 728, 730. In this SPMI bus configuration 720, $Latency_{Max}=4\times Latency_{Min}$. In the example where $Latency_{Min}=1.97$ µS, $Latency_{Max}=7.84$ µS.

The third SPMI bus configuration 740 corresponds to an example where five devices coupled to the SPMI bus 742 include an application processor 744 and four modems 746, 748, 750, 752. In the third SPMI bus configuration 740, $Latency_{Max}=5\times Latency_{Min}$. In the example where $Latency_{Min}=1.97$ µS, $Latency_{Max}=9.85$ µS.

Minimum and maximum latencies for the SPMI bus configurations 700, 720, 740 are illustrated in corresponding graphs 710, 732, 754 that also show the maximum latency times defined for certain 4G LTE and mmWave networks. In the illustrated example, where $Latency_{Min}=1.97$ µS, the maximum latency of 10 µS for 4G LTE can be met by each of the SPMI bus configurations 700, 720, 740 while only the first SPMI bus configuration 700 can operate within the maximum latency of 6 µS for mmWave.

The lack of a sender address in SPMI datagrams can limit the effectiveness of SPMI protocols in a coexistence management interface. Certain adaptations that can enable a receiver to determine the address of a sender of a datagram generally cause the receiver to operate in modes that are outside the scope of SPMI bus specifications. For example, the sender may be known when every device coupled to the bus is required to track bus arbitration procedures to determine which device wins arbitration to become the sender of the next datagram. All devices must remain active if knowledge of a sender by all devices is to be attained, thereby precluding certain devices from entering a sleep mode that would cause such devices to skip an arbitration phase. In a coexistence context, devices may be placed in sleep mode to reduce power consumption. In another example of deficiency, conventional SPMI bus specifications do not provide a secondary level protocol sufficient to support or address all use cases for coexistence management.

Certain aspects of the disclosure provide a flexible arbitration scheme that can support RF coexistence management using a serial bus that is operated in accordance with SPMI protocols. In one aspect, communication opportunities for coexistence messaging can be guaranteed for all devices sharing the serial bus while meeting the real-time constraints associated with coexistence management. In another aspect, certain techniques are disclosed that enable a receiver to independently determine the identity of a transmitting device without arbitration monitoring. SPMI protocols can remain unchanged when these techniques are implemented. In another aspect, secondary level protocols are defined that can enable an SPMI bus to support RF coexistence needs.

Figure 8:
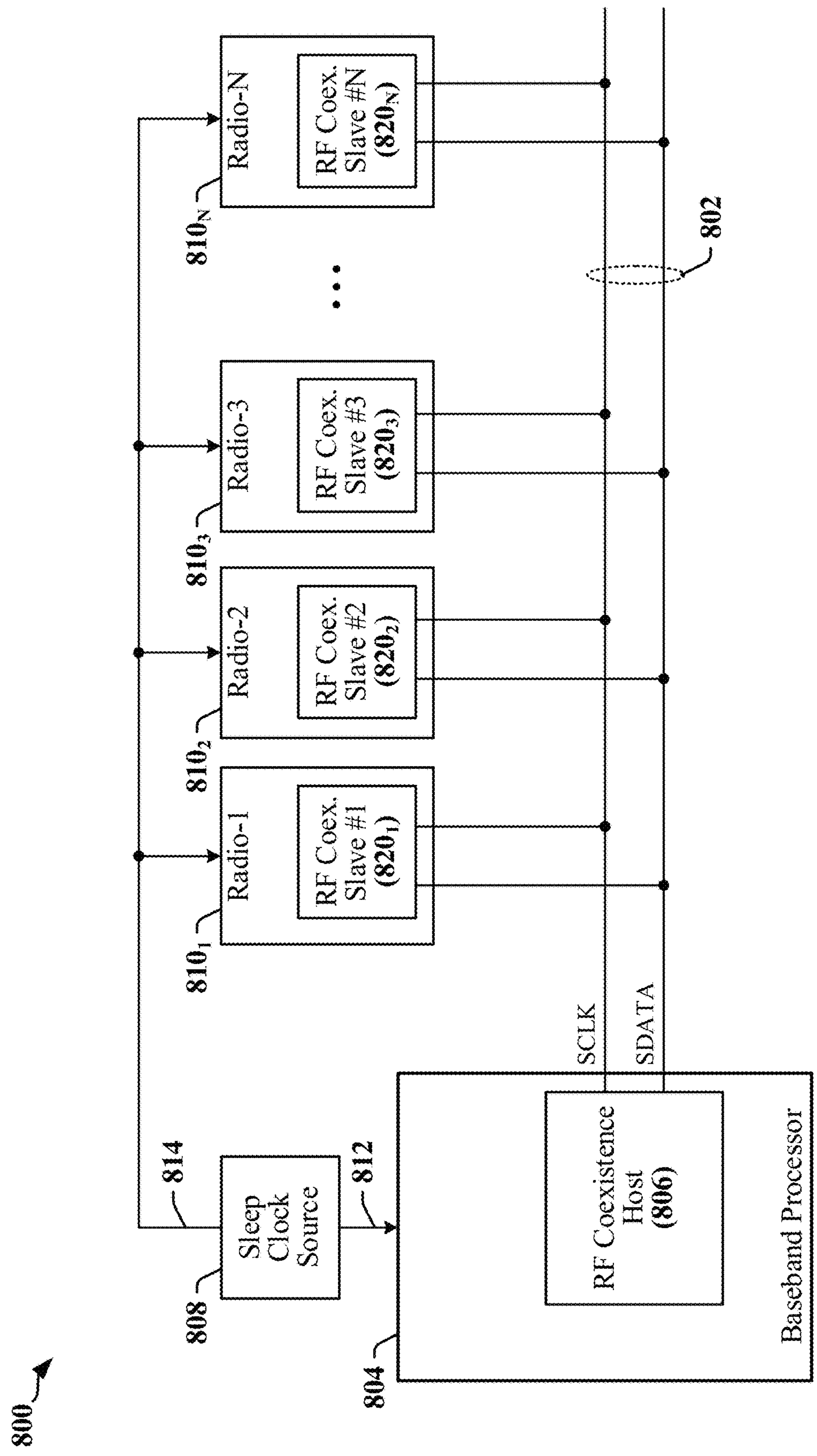
FIG. 8 illustrates an example of a system configured in accordance with certain aspects disclosed herein.

FIG. 8 illustrates an example of a system 800 configured in accordance with certain aspects disclosed herein. The system 800 includes a serial bus 802 operated in accordance with an SPMI protocol. In other examples, the serial bus 802 may be operated using another bus protocol such as the RFFE protocol. The system 800 includes a sleep clock source 808 to provide timing used to implement a form of time-division multiplexing (TDM) that defines time-slots, certain of which can be assigned for the use of a single request-capable slave device or for conventional address priority based arbitration. A baseband processor 804 is coupled to the serial bus 802 through an RF coexistence interface 806, and each of a number of the RF devices $810_1$-$810_N$ is coupled to the serial bus 802 through corresponding RF coexistence interface $820_1$-$820_N$.

Figure 9:
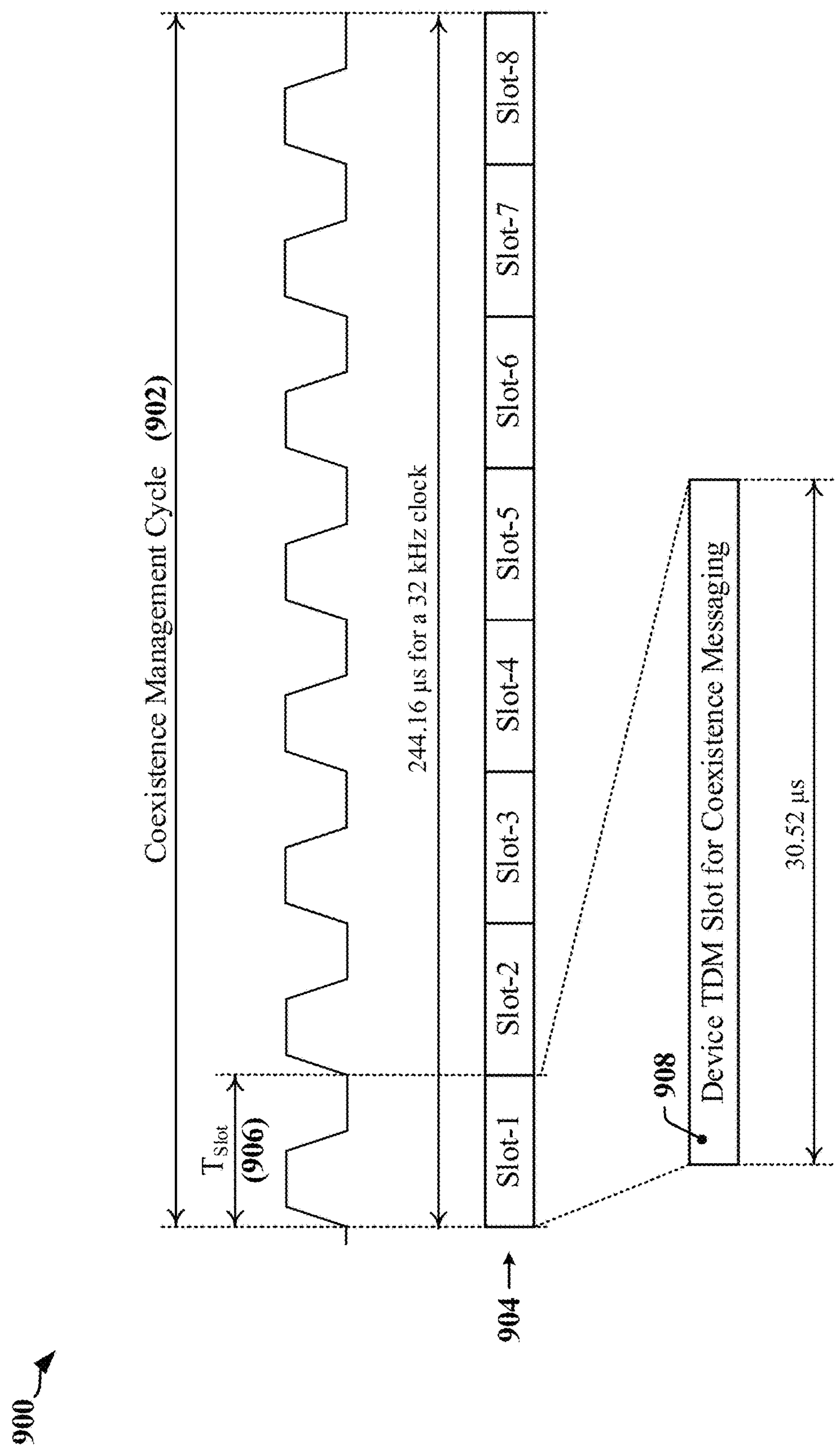
FIG. 9 illustrates a time division multiplexed configuration provided in accordance with certain aspects of the disclosure.

FIG. 9 illustrates a TDM configuration 900 that may be implemented in accordance with certain aspects disclosed herein, and by the system 800, for example. In one example described herein, six RF modems (e.g., in the RF devices $810_1$-$810_N$) are configured to operate as request-capable slave devices. The baseband processor 804 and the request-capable slave devices are each assigned one of eight available time-slots 904 in a coexistence management cycle 902. The eighth time-slot may be used for address priority based arbitration. The duration of each time-slot 908 may be configured to guarantee real-time behavior for all devices and to provide time-slots with a duration 906 sufficient to carry coexistence messages.

In one example, the sleep clock source 808 provides a 32.7654 kHz TDM clock signal 812, 814 to the baseband processor 804 and each RF device $810_1$-$810_N$. The 32.7654 kHz TDM clock signal 812, 814 may be referred to herein as the 32 kHz sleep clock signal. Each time-slot 908 corresponds to a cycle of the TDM clock signal 812, 814 and cycle has a duration 906 of 30.52 microseconds (µs). The coexistence management cycle 902 has a duration of 244.16 µs. The baseband processor 804 and each RF device $810_1$-$810_N$ uses the TDM clock signal 812, 814 to monitor the coexistence management cycle 902, to track time-slots, and/or to determine commencement of its assigned time-slot and/or a time-slot that is available for address priority based arbitration.

A device 804, $810_1$-$810_N$ may transmit a coexistence message during its assigned time-slot and may contend for access to the serial bus 802 during a time-slot that is available for address priority based arbitration. Time-slots may be assigned during system configuration, device initialization, during operation and/or in response to a command from an application. Each device 804, 810$_1$-810$_N$ can identify a transmitting device based on the position within the coexistence management cycle 902 of the time-slot that carries the message.

Figure 10:
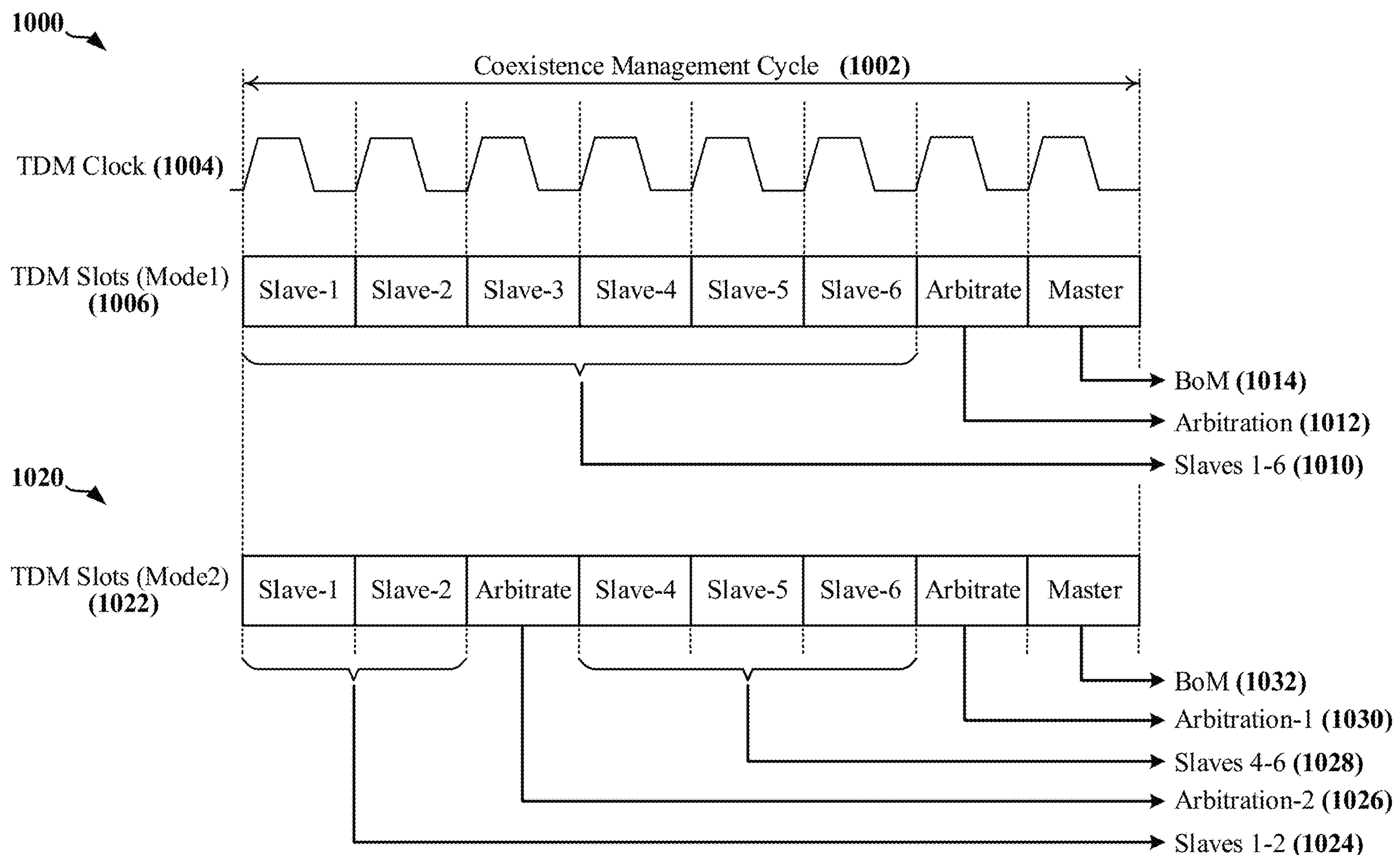
FIG. 10 illustrates examples of slot assignments in a system configured in accordance with certain aspects disclosed herein.

FIG. 10 illustrates examples of slot assignments 1000, 1020 in a system configured for TDM in accordance with certain aspects disclosed herein. A coexistence management cycle 1002 defines TDM slots 1006, 1022 that are provided in a cyclic order and that can be assigned for use as arbitrable TDM slots 1012, 1026, 1030 or that can be individually assigned to a device coupled to a serial bus. A slot assigned to a device coupled to the serial bus may be referred to as a fixed slot. A fixed slot can eliminate the need for the corresponding assigned device to participate in contested arbitration procedures. The initiator of a transaction, or transmitter of a command, during a fixed slot is automatically identifiable based on knowledge the assignments of devices to fixed slots. Devices coupled to the serial bus may be configured with information that maps fixed slots to unique device identifiers of the assigned devices. The slot duration determines the maximum time available for transaction initiated by an assigned device in a fixed slot or by a device that wins arbitration in an arbitrable TDM slot 1012, 1026, 1030.

In one example, the coexistence management cycle 1002 may be employed in the system 800 illustrated in FIG. 8. A TDM clock signal 1004 is used to define eight TDM slots 1006, 1022 in each coexistence management cycle 1002. Each TDM slot 1006, 1022 can be allocated or assigned for the use of a master device, including the BoM, and up to six slave devices. In one example, the TDM clock signal 1004 may correspond to the TDM clock signal 812, 814 provided by the sleep clock source 808 of FIG. 8, the BoM may correspond to the baseband processor 804 of FIG. 8, and the slave devices may be request-capable slave devices included in the RF device 810$_1$-810$_N$ of FIG. 8. In this example, the TDM clock signal 1004 is used to provide eight 30.52 μs slots and a coexistence management cycle 1002 that repeats every 244.16 μs.

In the first illustrated example of slot assignment 1000, six TDM slots 1010 are assigned to individual slave devices (Slave-1 to Slave-6). Each slave device assigned one of the TDM slots 1010 may be uniquely permitted to initiate a transaction within its assigned time slot. In some implementations, the transaction may be initiated without arbitration when a slave device is uniquely permitted to initiate transactions over the serial bus during its assigned time slot. In some implementations, the transaction may include an arbitration phase that is uncontested because no device is permitted to initiate a transaction in a slot assigned to another device. In the first illustrated example of slot assignment 1000, a TDM slot 1014 is assigned for the exclusive use of the BoM. Only the BoM is permitted to initiate a transaction in the TDM slot 1014 assigned to the BoM. The provision of a transmission opportunity in every coexistence management cycle 1002 enables deterministic, real-time operation of the serial bus. The term deterministic may refer to a serial bus for which timing can be guaranteed within a certain margin of error. Certain aspects of this disclosure provide systems in which timing can be guaranteed within the tolerances defined for the TDM clock signal 1004.

A TDM slot 1012 is reserved for general use and provides for an arbitration phase that may be contested by any device coupled to the serial bus. The arbitration phase may be used to implement a multi-slave access protocol (MSAP) with collision detection (MSAP-CD) such as the arbitration procedures described in relation to FIG. 6. A contested arbitration phase occurs when more than one device attempts to initiate a transaction over the serial bus. During a contested arbitration phase, two or more devices transmit their addresses, resulting in a collision on the serial bus that is detected by the lower priority device. In accordance with MSAP-CD protocols, the highest priority device prevails and gains control of the serial bus. Availability of the TDM slot 1012 used for MSAP-CD provides an opportunity that can be opened to all devices for communication, without compromising with the deterministic real-time behavior of the system.

The second illustrated example of slot assignment 1020 relates to a configuration of the coexistence management cycle 1002 in which the master device has reassigned a TDM slot 1026 for use with MSAP-CD based arbitration resolution. In some implementations the master device may reassign the TDM slot 1026 when the originally-assigned slave device (here, Slave-3) is sleeping or otherwise inactive. In this configuration, five TDM slots 1024, 1028 are assigned to individual slave devices (Slave-1, Slave-2 and Slave-4 to Slave-6). Each slave device assigned one of the TDM slots 1024, 1028 can initiate a transaction without an arbitration phase or with an uncontested arbitration phase. In the second illustrated example of slot assignment 1020, a TDM slot 1032 is assigned for the exclusive use of the BoM. Only the BoM is permitted to initiate a transaction in the TDM slot 1032 assigned to the BoM. In this example, two TDM slots 1026, 1030 are provided for general use through an arbitration phase that may be contested by any device coupled to the serial bus.

The provision of a transmission opportunity in a fixed slot in every coexistence management cycle 1002 enables deterministic, real-time operation of the serial bus for active devices. In some implementations, an earlier assigned time-slot can be declared or identified as available for multi-device arbitration. In one example, the baseband processor 804 of FIG. 8 may configure one or more of the RF devices 810$_1$-810$_N$ to treat a time-slot previously assigned to another RF device 810$_1$-810$_N$ as an arbitrable slot when the other RF device 810$_1$-810$_N$ or its RF coexistence interface 820$_1$-820$_N$ has entered sleep mode for a duration of time. In some instances, the BoM may reconfigure the slot assignments to provide or increase temporal separation between arbitrable TDM slots. In some instances, the BoM may reconfigure the slot assignments to provide arbitrable slots in successive slots of the coexistence management cycle 1002 thereby obtaining a multi-slot arbitrable period. Upon waking, the sleeping or inactive device may be reassigned its TDM slot 1026 or another TDM slot.

Figure 11:
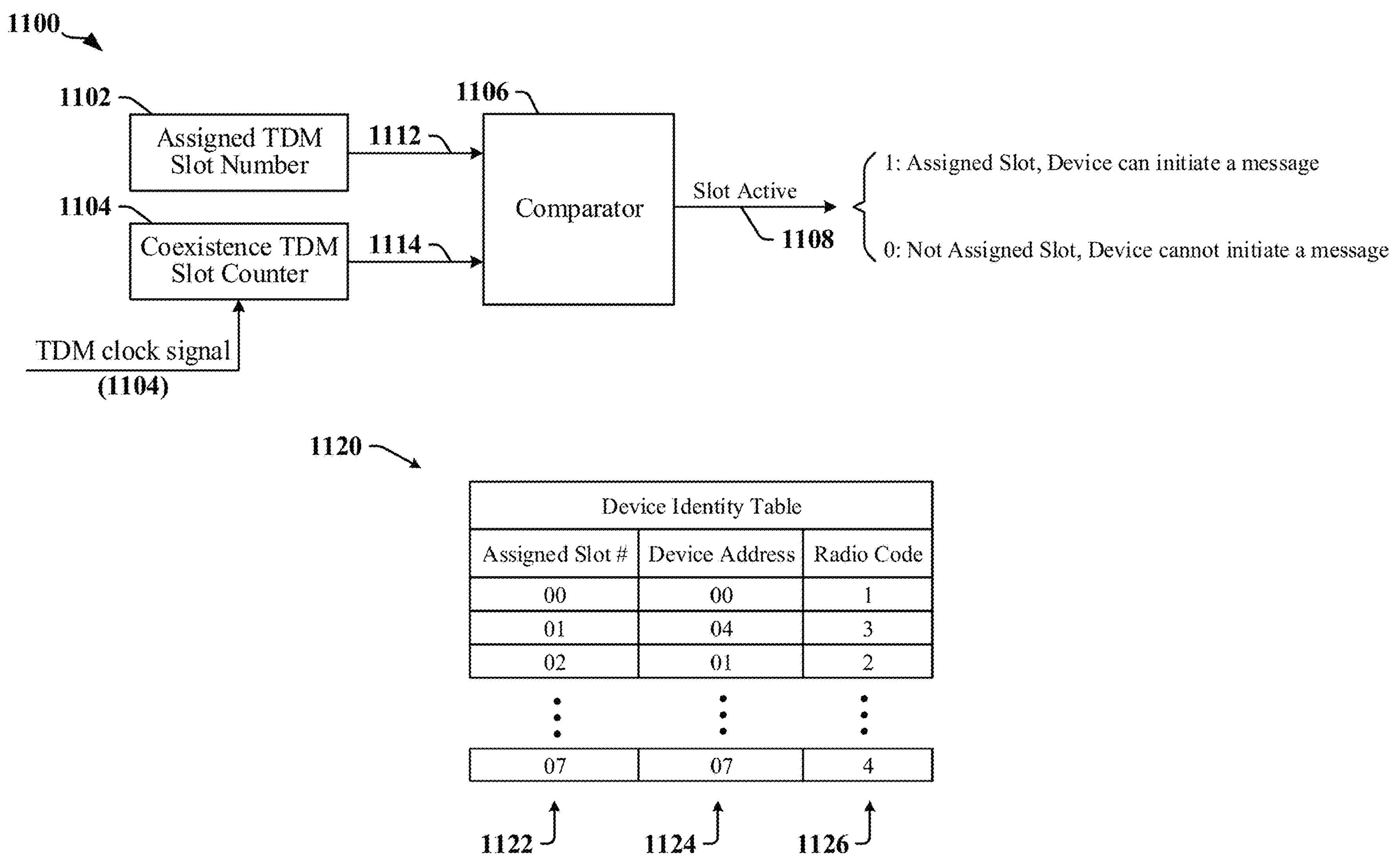
FIG. 11 illustrates a circuit supporting time division multiplexing for slave devices in accordance with certain aspects of this disclosure.

FIG. 11 illustrates a TDM circuit 1100 provided in slave devices adapted in accordance with certain aspects of this disclosure. The TDM circuit 1100 includes a TDM slot-number register 1102, a TDM slot counter 1104 and a comparator 1106. The TDM slot-number register 1102 in each slave device may be configured with the TDM slot number assigned to the slave device. The TDM slot-number register 1102 provides a multibit representation 1112 of the assigned TDM slot number 1114 to the comparator 1106. The TDM slot counter 1104 may be configured to count cycles of the TDM clock signal 814 and to provide a multibit TDM slot count 1114 to the comparator 1106. The comparator 1106 provides an output 1108 that indicates when the time-slot assigned to the slave device is active, based on a comparison of the outputs of the TDM slot-number register 1102 and TDM slot counter 1104. A slave device can initiate a message during its assigned time-slot. In some implementations, the comparator 1106 may be configured to compare the output of the TDM slot counter 1104 to multiple TDM slot-number registers 1102 that identify the time-slot assigned to the slave device and/or one or more time-slots that are available for address priority based arbitration. In some implementations, multiple comparators 1106 may be configured to compare the output of the TDM slot counter 1104 to multiple TDM slot-number registers 1102 that identify the time-slot assigned to the slave device and/or one or more time-slots that are available for address priority based arbitration.

In certain implementations, slave devices may maintain, include or provide a lookup table that identifies devices that are coupled to a serial bus that employs a TDM scheme in accordance with this disclosure. In one example, a slave device may maintain a device identity table 1120 that is accessible to the TDM circuit 1100. In one example, the device identity table 1120 may be indexed by slot number 1122, and the slot number entry for each slot may be associated with a unique slave address 1124 corresponding to the slave that can initiate transactions in the slot associated with the slot number. The slot number entry for each slot may be associated with other information that identifies coexistence information related to the slave that can initiate transactions in the slot associated with the slot number. For example, the device identity table 1120 may associate a radio code 1126 with each slot number entry, where the radio code can be used to identify RF characteristics such as send/receive frequencies, radio access technology, antenna usage, and the like.

Figure 12:
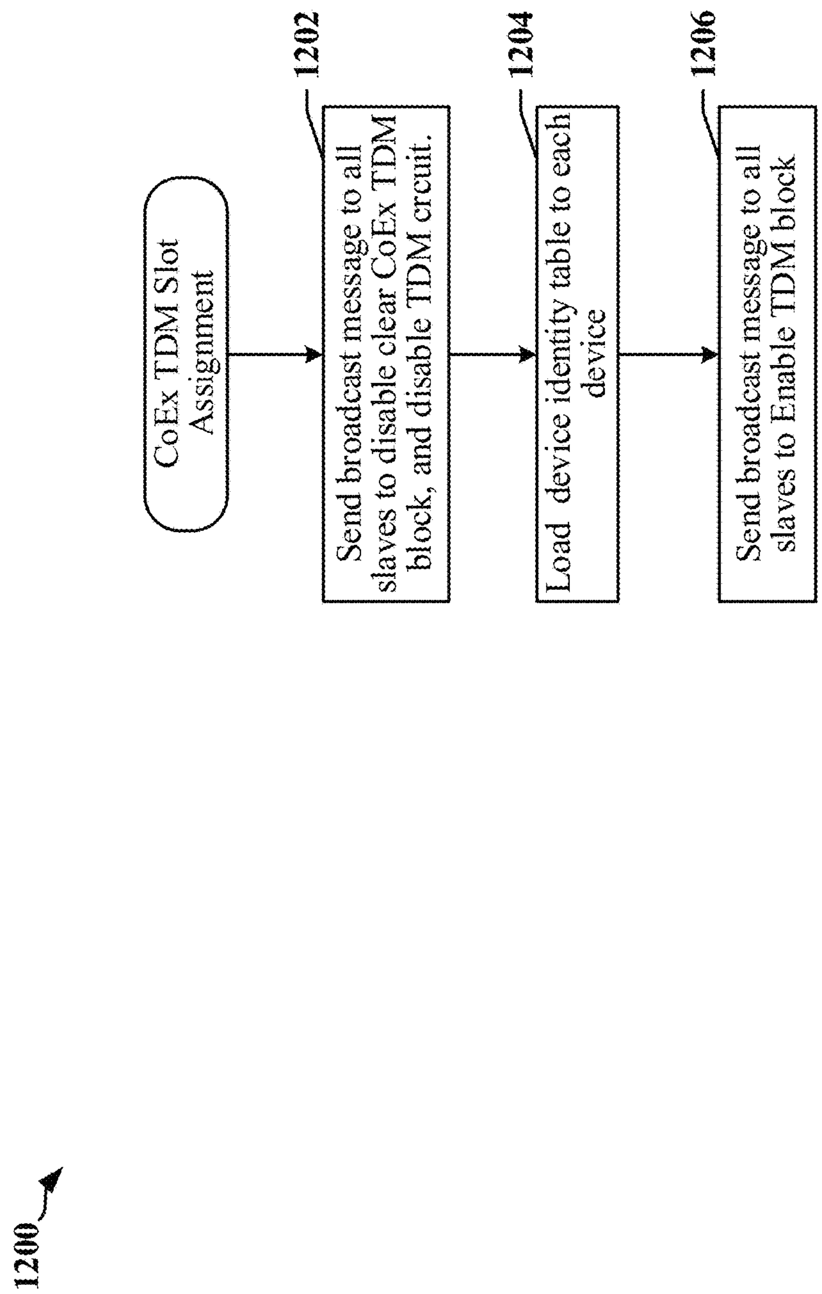
FIG. 12 is a first flowchart that illustrates an example of a time-slot assignment procedure in accordance with certain aspects disclosed herein.

FIG. 12 illustrates an example of a time-slot assignment procedure 1200 in accordance with certain aspects disclosed herein. At block 1202, the baseband processor 804 may send a broadcast message over the serial bus 802 to all slave devices coupled to the serial bus 802, including the RF devices $\mathbf{810}_1$-$\mathbf{810}_N$. The broadcast message may cause the TDM circuit 1100 to be disabled and cleared in each slave device. Clearing the TDM circuit 1100 may include resetting TDM slot counter 1104, clearing the TDM slot-number register 1102 and/or clearing the device identity table 1120. At block 1204, the baseband processor 804 may send one or more messages that load the device identity table 1120 and the TDM slot-number register 1102. In some implementations, a broadcast message may be used to load the device identity table 1120 in each slave device. In some instances, a request-capable slave device may be configured to load its TDM slot-number register 1102 by referencing the device identity table 1120. At block 1206, the baseband processor 804 may send a broadcast message over the serial bus 802 that causes the TDM circuit 1100 in each slave device to be enabled and synchronized to the clock signal 812, 814. In some instances, the broadcast message may be sent to cause the TDM circuit 1100 in each slave device to be enabled and synchronized after safe receipt of the device identity table 1120 at all of the slave devices has been acknowledged or confirmed. In some instances, the broadcast message may be sent to cause the TDM circuit 1100 in each slave device to be enabled and synchronized after the baseband processor 804 has determined that all of the slave devices have been successfully configured with the device identity table 1120. In one example, the baseband processor 804 may interrogate one or more registers in each slave device that indicate whether the device identity table 1120 has been configured with current and/or correct information.

The coexistence management cycle 902, 1002 illustrated in FIGS. 9 and 10 provide fixed duration TDM slots configured to guarantee real-time behavior for all devices and to provide time-slots with a duration sufficient to carry coexistence messages. In the example of FIGS. 9 and 10, the 32 kHz sleep clock signal may serve as a TDM clock signal used to define eight 30.52 μs slots in a 244.16 μs coexistence management cycle. In order to maintain deterministic real-time performance, transmissions within each are expected to terminate before the end of the slot. Certain aspects of the disclosure provide a secondary protocol that defines formats of data payloads transmitted within TDM slots.

Figure 13:
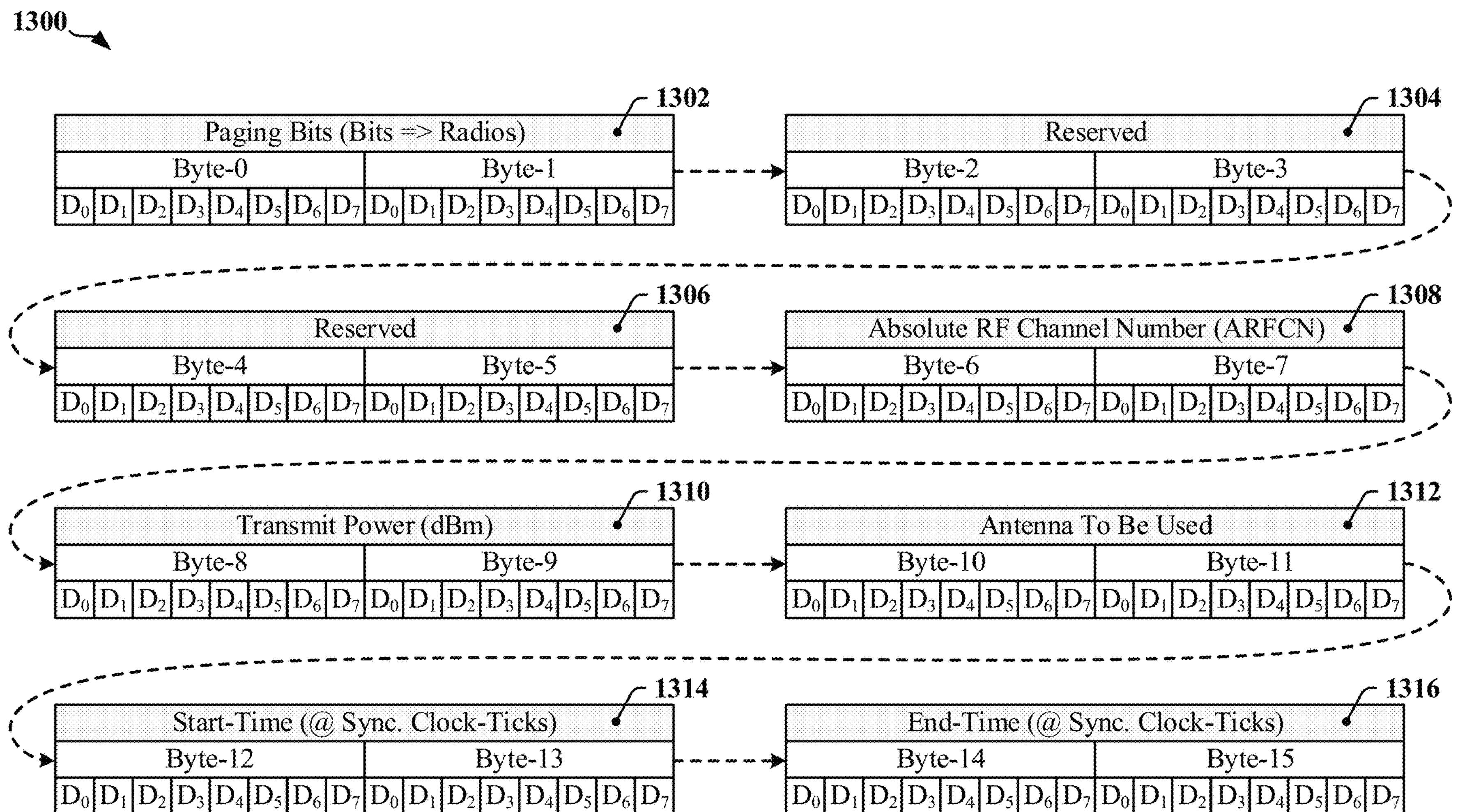
FIG. 13 illustrates one example of a data payload defined by a secondary-level protocol used for coexistence management over a serial bus adapted in accordance with certain aspects disclosed herein.

FIG. 13 illustrates one example of a data payload 1300 defined by a secondary-level protocol used for coexistence management over a serial bus adapted in accordance with certain aspects disclosed herein. The secondary-level protocol may accommodate certain parameters used for coexistence management. In the illustrated example the devices coupled to the serial bus are configured to support TDM and communicate within each TDM slot in accordance with an SPMI protocol.

In the example of the secondary coexistence management protocol, eight 16-bit words are defined in the payload. A first word 1302 carries paging bits that may identify, for example, which transmitters are going to transmit and/or the frequency of transmission. Two words 1304, 1306 may be reserved for radio frequency unit (RFU) information. The RFU may perform frequency translation between baseband and radio transmission frequency and other functions. A fourth word 1308 carries an absolute radio-frequency channel number (ARFCN), which specifies physical radio carriers used for transmitting and receiving in a mobile radio network. A fifth word 1310 defines the transmitter power and a sixth byte 1312 identifies an antenna to be used for the transmission. A seventh word 1314 indicates the start time of the transmission in synchronized clock ticks, and an eighth word 1316 indicates the end time of the transmission in synchronized clock ticks.

Figure 14:
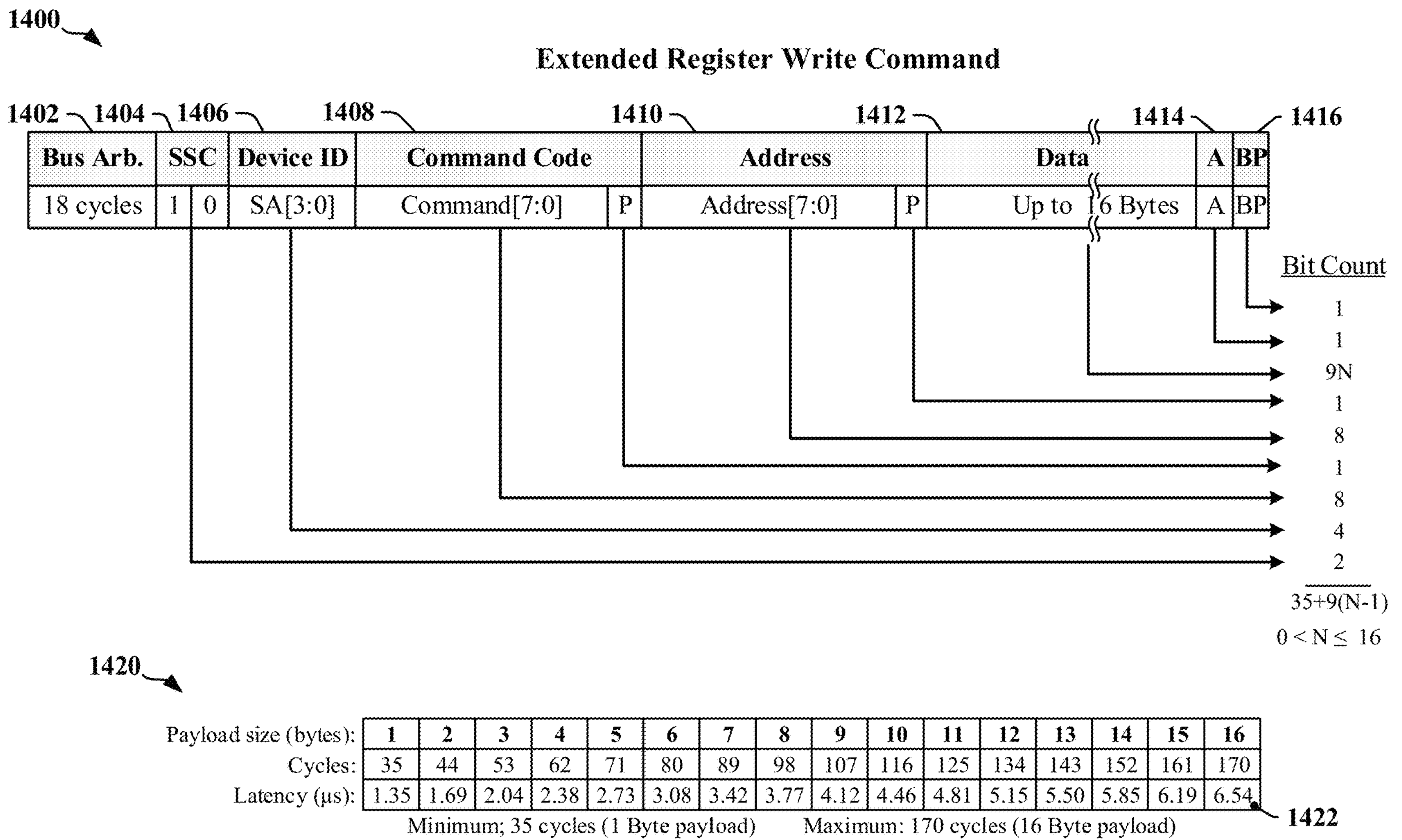
FIG. 14 illustrates a datagram for an Extended Register Write command that may be transmitted over a serial bus adapted in accordance with certain aspects of this disclosure.

In certain implementations, the data payload 1300 may be carried in an extended data write datagram defined by SPMI protocols, which can carry up to 16 bytes of payload data. FIG. 14 illustrates a datagram 1400 for an Extended Register Write (ERW) command that may be transmitted over a serial bus. The datagram 1400 is conventionally transmitted by a device that wins bus arbitration during an arbitration sequence 1402. Certain aspects of this disclosure render bus arbitration redundant in slots dedicated or otherwise assigned to a single device, which is the only device permitted to initiate a transaction in its assigned slot. Accordingly, the arbitration sequence 1402 can be omitted in TDM slots assigned to a single device.

The datagram 1400 commences with a two-bit sequence start condition (SSC 1404) followed by a four-bit slave address 1406 or other device identifier. An 8-bit command code 1408 is provided with a parity bit. The command code 1408 includes a 4-bit byte count (BC[3:0]) that indicates the number of frames of data to be carried in the data payload. The command code 1408 is followed by an 8-bit register address 1410 with parity. The data payload 1412 includes between one and sixteen 9-bit frames of data, each frame of data including an 8-bit data byte and 1 parity bit. After transmission of a final data frame, an acknowledgement bit 1414 (ACK/NACK) may be provided by the receiving device. The datagram 1400 is terminated by bus park signaling 1416.

Each datagram 1400 that carries an ERW command uses $35+9\times(N-1)$ serial bus clock cycles, where N represents the number of frames of data carried in the data payload 1412, and where N has a minimum value of 1 and a maximum value of 16. A minimum of 35 cycles is used by the datagram 1400 when a single frame of data is carried in the data payload 1412. This minimum number includes 9 cycles for use of the first-transmitted data frame, 2 cycles for the SSC 1404, four cycles for the slave address 1406, 9 cycles for the command code 1408, 9 cycles for the register address 1410 and one cycle each for the acknowledgement bit 1414 and bus park signaling 1416. Each additional data frame transmitted in the data payload 1412 consumes 9 cycles of the serial bus clock and a datagram 1400 that carries 16 data frames in the data payload 1412 is transmitted in 170 cycles of the serial bus clock.

An SPMI serial bus operated in accordance with certain aspects of this disclosure can be configured to meet timing requirements imposed by certain coexistence management applications. FIG. 14 includes a table 1420 that illustrates the bus latency associated with different ERW payload sizes of an SPMI datagram 1400 transmitted over a serial bus at a clock rate of 26 MHz. The duration of each cycle of the serial bus clock is 0.38 μs, and the resulting maximum latency 1422 is 6.54 μs, calculated for a 16 byte payload. TDM slots defined for the SPMI bus using a 32.765 kHz sleep clock have a duration of 30.52 μs, and the maximum-sized coexistence datagram 1400 occupies less than 22% of the duration of the TDM slot. In some implementations, the TDM slot may be used to carry multiple datagrams.

Examples of Processing Circuits and Methods

Figure 15:
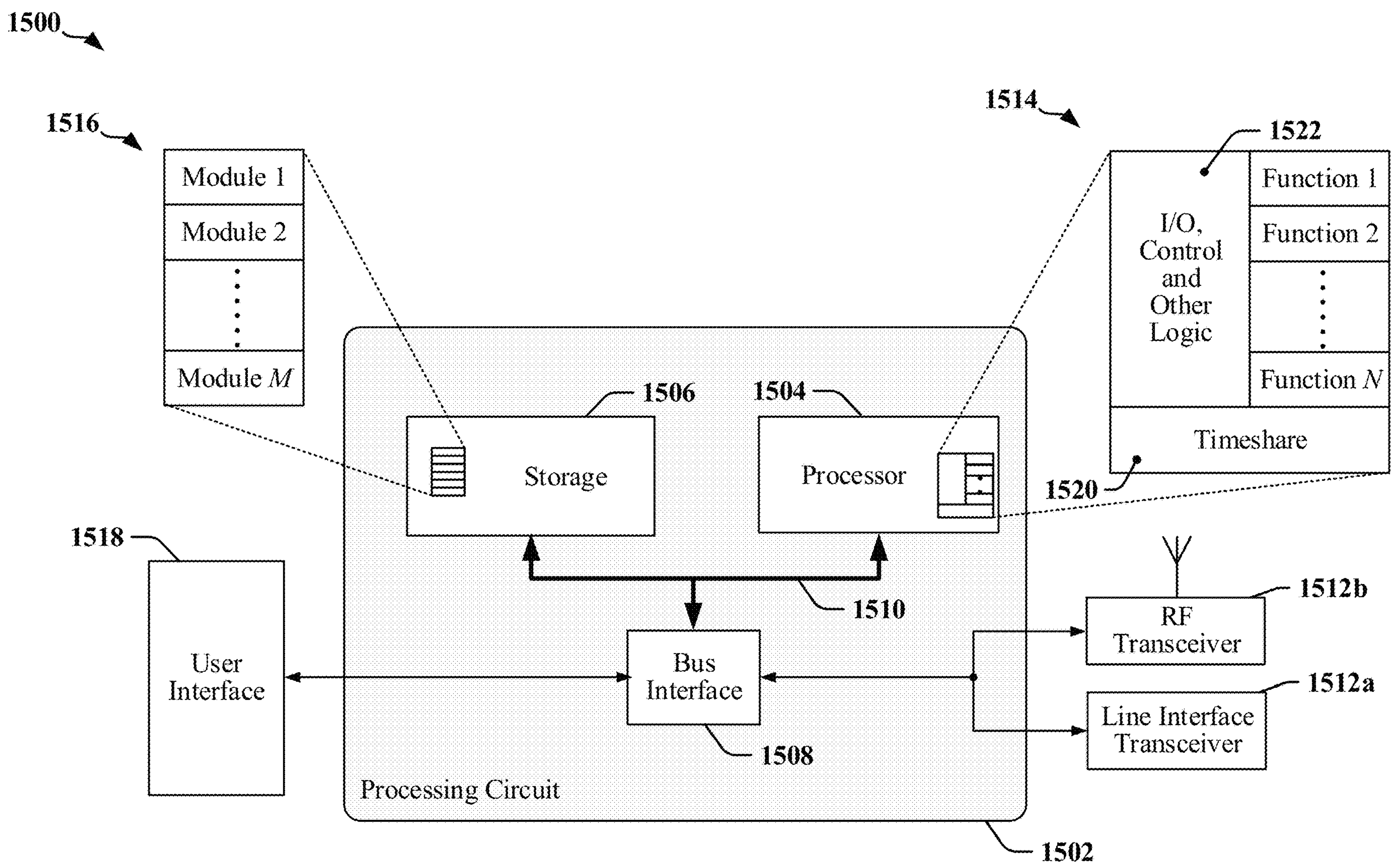
FIG. 15 illustrates one example of an apparatus employing a processing circuit that may be adapted according to certain aspects disclosed herein.

FIG. 15 is a diagram illustrating an example of a hardware implementation for an apparatus 1500. In some examples, the apparatus 1500 may perform one or more functions disclosed herein. In accordance with various aspects of the disclosure, an element, or any portion of an element, or any combination of elements as disclosed herein may be implemented using a processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512*a*, 1512*b*. A transceiver 1512*a*, 1512*b* may be provided for each networking technology supported by the processing circuit. In some instances, multiple networking technologies may share some or all of the circuitry or processing modules found in a transceiver 1512*a*, 1512*b*. Each transceiver 1512*a*, 1512*b* provides a means for communicating with various other apparatus over a transmission medium. In one example, a transceiver 1512*a* may be used to couple the apparatus 1500 to a multi-wire bus. In another example, a transceiver 1512*b* may be used to connect the apparatus 1500 to a radio access network. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. The computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as a transceiver 1512*a*, 1512*b*, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to a transceiver 1512*a*, 1512*b*, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512*a*, 1512*b*, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that assigns control of the one or more processors 1504 in accordance with a prioritization of the functions, and/or an interrupt driven main loop that responds to external events by providing control of the one or more processors 1504 to a handling function.

Figure 16:
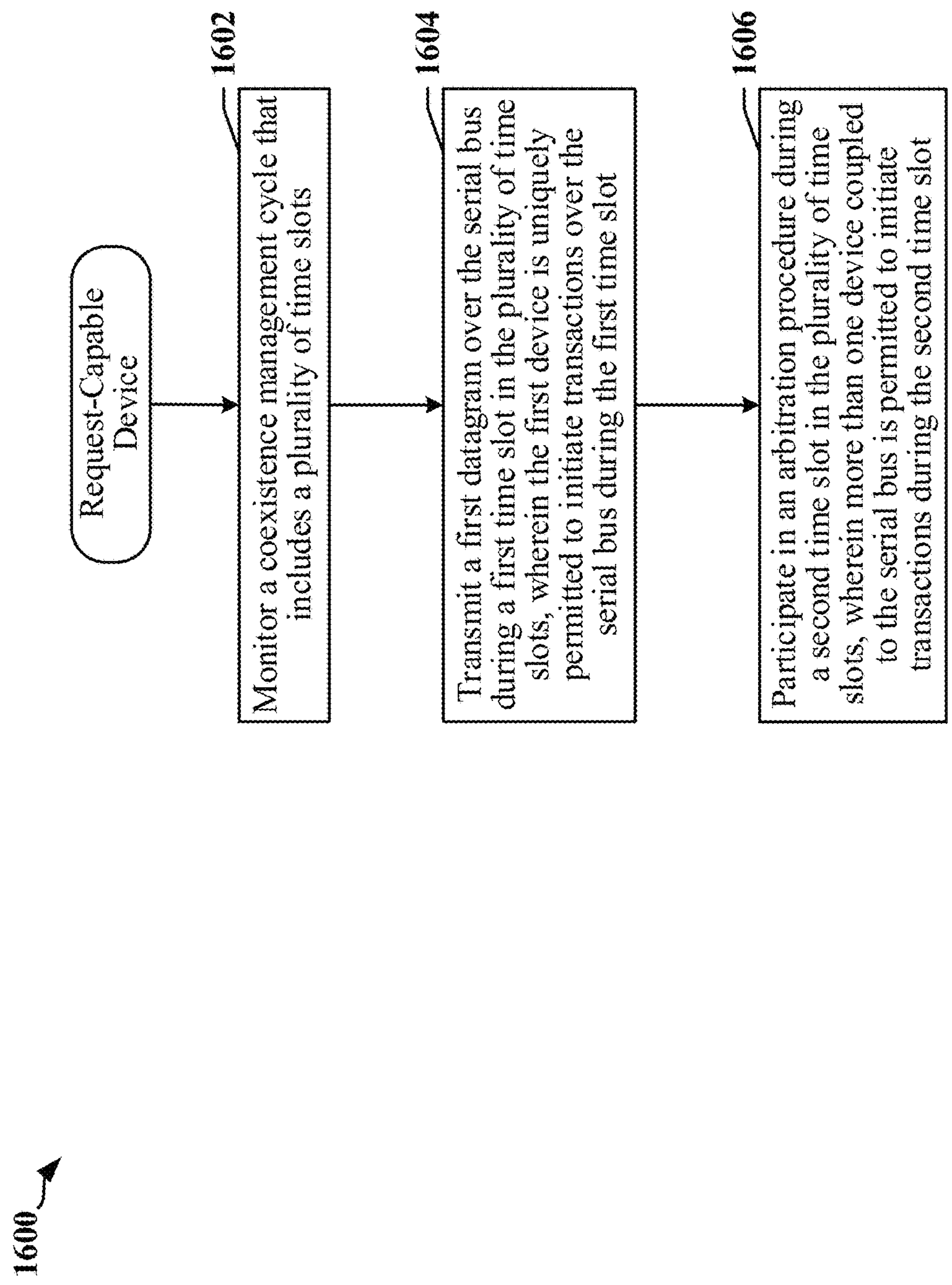
FIG. 16 is a second flowchart that illustrates certain aspects disclosed herein.

FIG. 16 is a flowchart 1600 of a method that may be performed by a first device coupled to a serial bus. In one example, the serial bus may be operated in accordance with SPMI specifications. In another example, the serial bus may be operated in accordance with RFFE specifications. At block 1602, the first device may monitor a coexistence management cycle that includes a plurality of time slots. At block 1604, the first device may transmit a first datagram over the serial bus during a first time slot in the plurality of time slots. The first device may be uniquely permitted to initiate transactions over the serial bus during the first time slot. At block 1606, the first device may participate in an arbitration procedure during a second time slot in the plurality of time slots. More than one device coupled to the serial bus is permitted to initiate transactions during the second time slot. In one example, the first device is a request-capable slave device. In another example, the first device is bus master device.

In certain examples, the duration of each time slot in the plurality of time slots is defined by cycle time of a clock signal received independently of the serial bus. Each time slot may repeat at a rate defined by the number of time slots included in the coexistence management cycle. In some examples, the first device may receive a clock signal independently of the serial bus. The clock signal may define timing of a plurality of cycles in the coexistence management cycle. The clock signal may include a real time clock signal or a sleep clock signal coupled to each device that is coupled to the serial bus. In some instances, the clock signal has a frequency of approximately 32 kHz. In some instances, the clock signal has a frequency of approximately 32.765 kHz.

In one example, the first device may receive a second datagram in a third time slot in the plurality of time slots, and identify a transmitter of the second datagram based on position of the third time slot within the coexistence management cycle.

In certain examples, the first device may maintain slot information associating one or more time slots within the coexistence management cycle with identifiers of each device uniquely permitted to initiate transactions over the serial bus during one of the one or more time slots. The first device may receive the slot information from a master device while the coexistence management cycle is disabled, receive a start command from the master device that initiates the coexistence management cycle, and commence monitoring of the coexistence management cycle after receiving the start command. The slot information may associate the one or more slots within the coexistence management cycle with information characterizing radio frequency interfaces in each device uniquely permitted to initiate transactions over the serial bus during the one or more slots. The first datagram may include a payload of coexistence management information. The first datagram may be transmitted in accordance with SPMI protocols, RFFE protocols or other protocols.

Figure 17:
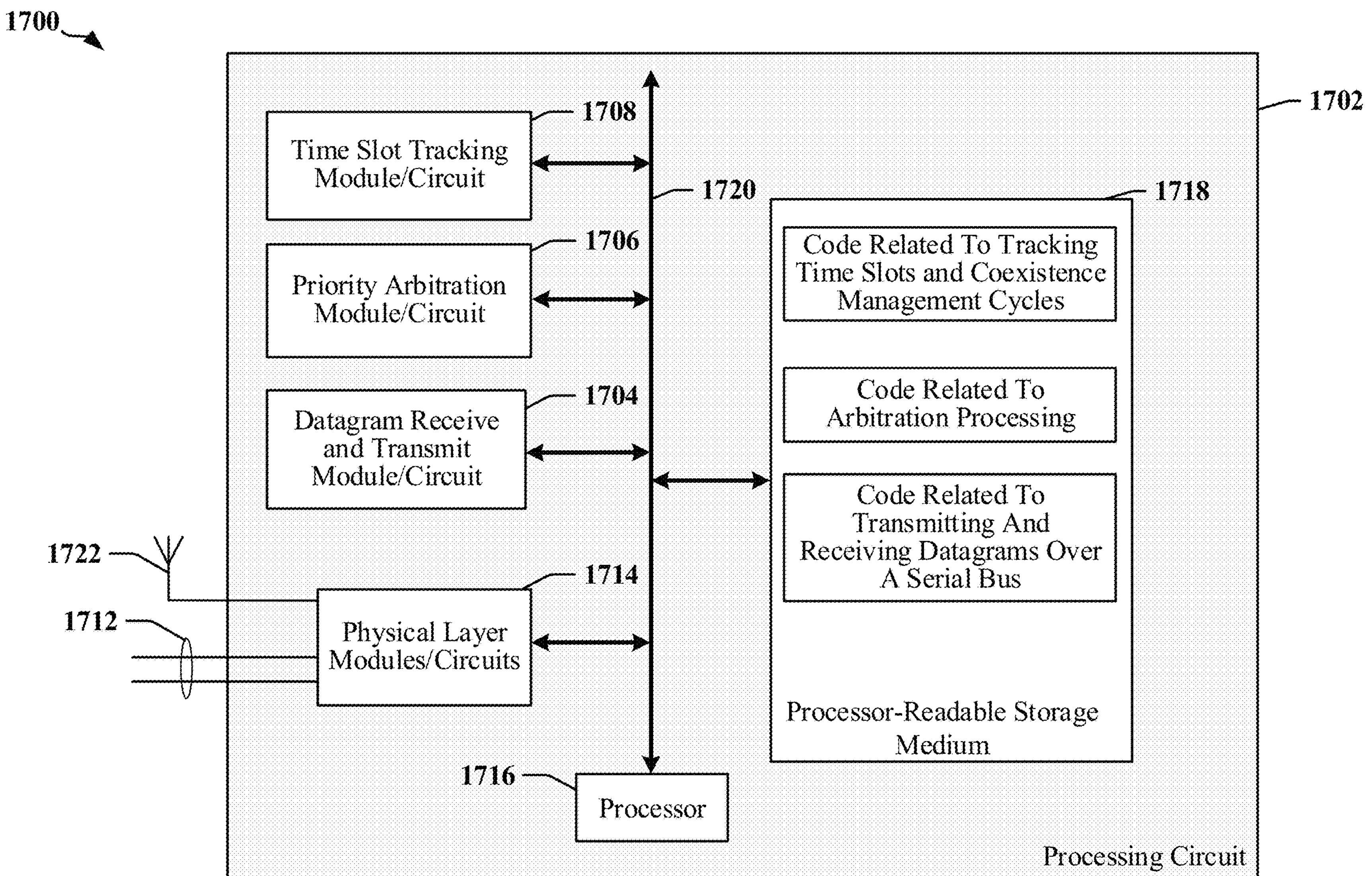
FIG. 17 illustrates a first example of a hardware implementation for an apparatus adapted in accordance with certain aspects disclosed herein.

FIG. 17 is a diagram illustrating a simplified example of a hardware implementation for an apparatus 1700 employing a processing circuit 1702. The processing circuit typically has a controller or processor 1716 that may include one or more microprocessors, microcontrollers, digital signal processors, sequencers and/or state machines. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the controller or processor 1716, the modules or circuits 1704, 1706 and 1708 and the processor-readable storage medium 1718. One or more physical layer circuits and/or modules 1714 may be provided to support communication over a communication link implemented using a multi-wire bus 1712, through an antenna or antenna array 1722 (to a radio access network for example), and so on. The bus 1720 may also link various other circuits such as timing sources, peripherals, voltage regulators, and power management circuits, which are well known in the art, and therefore, will not be described any further.

The processor 1716 is responsible for general processing, including the execution of software, code and/or instructions stored on the processor-readable storage medium 1718. The processor-readable storage medium 1718 may include a non-transitory storage medium. The software, when executed by the processor 1716, causes the processing circuit 1702 to perform the various functions described supra for any particular apparatus. The processor-readable storage medium 1718 may be used for storing data that is manipulated by the processor 1716 when executing software. The processing circuit 1702 further includes at least one of the modules 1704, 1706 and 1708. The modules 1704, 1706 and 1708 may be software modules running in the processor 1716, resident/stored in the processor-readable storage medium 1718, one or more hardware modules coupled to the processor 1716, or some combination thereof. The modules 1704, 1706 and 1708 may include microcontroller instructions, state machine configuration parameters, or some combination thereof.

In one configuration, the apparatus 1700 includes modules and/or circuits 1708 adapted to track time slot in a coexistence management cycle, modules and/or circuits 1706 adapted to participate in priority arbitration procedures, and modules and/or circuits 1704 adapted to configure, conduct and/or participate in transactions over the multi-wire bus 1712 configured to operate according to SPMI specifications or protocols.

In certain implementations, the apparatus 1700 includes physical layer circuits and/or modules 1714 that implement an interface circuit adapted to couple the apparatus 1700 to the multi-wire bus 1712. The apparatus 1700 may have a slot counter configured to monitor a coexistence management cycle that includes a plurality of time slots. The apparatus 1700 may have a processor 1716 configured to transmit a first datagram through the interface circuit during a first time slot in the plurality of time slots. The apparatus may be uniquely permitted to initiate transactions over the serial bus during the first time slot. The processor 1716 may be further configured to participate in an arbitration procedure during a second time slot in the plurality of time slots. More than one device coupled to the serial bus may be permitted to initiate transactions in the second time slot.

In certain examples, the duration of each time slot in the plurality of time slots is defined by cycle time of a clock signal received independently of the serial bus. Each time slot may repeat at a rate defined by the number of time slots included in the coexistence management cycle. In some examples, the processor 1716 may be configured to receive a clock signal independently of the serial bus. The clock signal may define timing of a plurality of cycles in the coexistence management cycle. The clock signal may include a real time clock signal or a sleep clock signal coupled to each device that is coupled to the serial bus. In some instances, the clock signal has a frequency of approximately 32 kHz. In some instances, the clock signal has a frequency of 32.765 kHz.

In one example, the processor 1716 may be configured to receive a second datagram in a third time slot in the plurality of time slots, and identify a transmitter of the second datagram based on position of the third time slot within the coexistence management cycle.

In certain examples, the processor 1716 may be configured to maintain slot information associating one or more time slots within the coexistence management cycle with identifiers of each device uniquely permitted to initiate transactions over the serial bus during one of the one or more time slots. The processor 1716 may be configured to receive the slot information from a master device while the coexistence management cycle is disabled, receive a start command from the master device that initiates the coexistence management cycle, and commence monitoring of the coexistence management cycle after receiving the start command. The slot information may associate the one or more slots within the coexistence management cycle with information characterizing radio frequency interfaces in each device uniquely permitted to initiate transactions over the serial bus during the one or more slots. The first datagram may include a payload of coexistence management information. The first datagram may be transmitted in accordance with SPMI protocols, RFFE protocols or other protocols.

The processor-readable storage medium 1718 may include transitory or non-transitory storage devices configured to store code, instructions and/or parameters used to implement one or more methods or procedures disclosed herein. The processor-readable storage medium 1718 may include code for monitoring a coexistence management cycle that includes a plurality of time slots, transmitting a first datagram over the serial bus during a first time slot in the plurality of time slots where the first device is uniquely permitted to initiate transactions over the serial bus during the first time slot, and participating in an arbitration procedure during a second time slot in the plurality of time slots. More than one device coupled to the serial bus may be permitted to initiate transactions during the second time slot.

In certain examples, the duration of each time slot in the plurality of time slots is defined by cycle time of a clock signal received independently of the serial bus. Each time slot may repeat at a rate defined by the number of time slots included in the coexistence management cycle. In some examples, the processor-readable storage medium 1718 may include code for receiving a clock signal independently of the serial bus. The clock signal may define timing of a plurality of cycles in the coexistence management cycle. The clock signal may include a real time clock signal or a sleep clock signal coupled to each device that is coupled to the serial bus. In some instances, the clock signal has a frequency of approximately 32 kHz. In some instances, the clock signal has a frequency of 32.765 kHz.

In one example, the processor-readable storage medium 1718 may include code for receiving a second datagram in a third time slot in the plurality of time slots, and identifying a transmitter of the second datagram based on position of the third time slot within the coexistence management cycle.

In certain examples, the processor-readable storage medium 1718 may include code for maintaining slot information associating one or more time slots within the coexistence management cycle with identifiers of each device uniquely permitted to initiate transactions over the serial bus during one of the one or more time slots. The processor-readable storage medium 1718 may include code for receiving the slot information from a master device while the coexistence management cycle is disabled, receiving a start command from the master device that initiates the coexistence management cycle, and commencing monitoring of the coexistence management cycle after receiving the start command. The slot information may associate the one or more slots within the coexistence management cycle with information characterizing radio frequency interfaces in each device uniquely permitted to initiate transactions over the serial bus during the one or more slots. The first datagram may include a payload of coexistence management information. The first datagram may be transmitted in accordance with SPMI protocols, RFFE protocols or other protocols.

Figure 18:
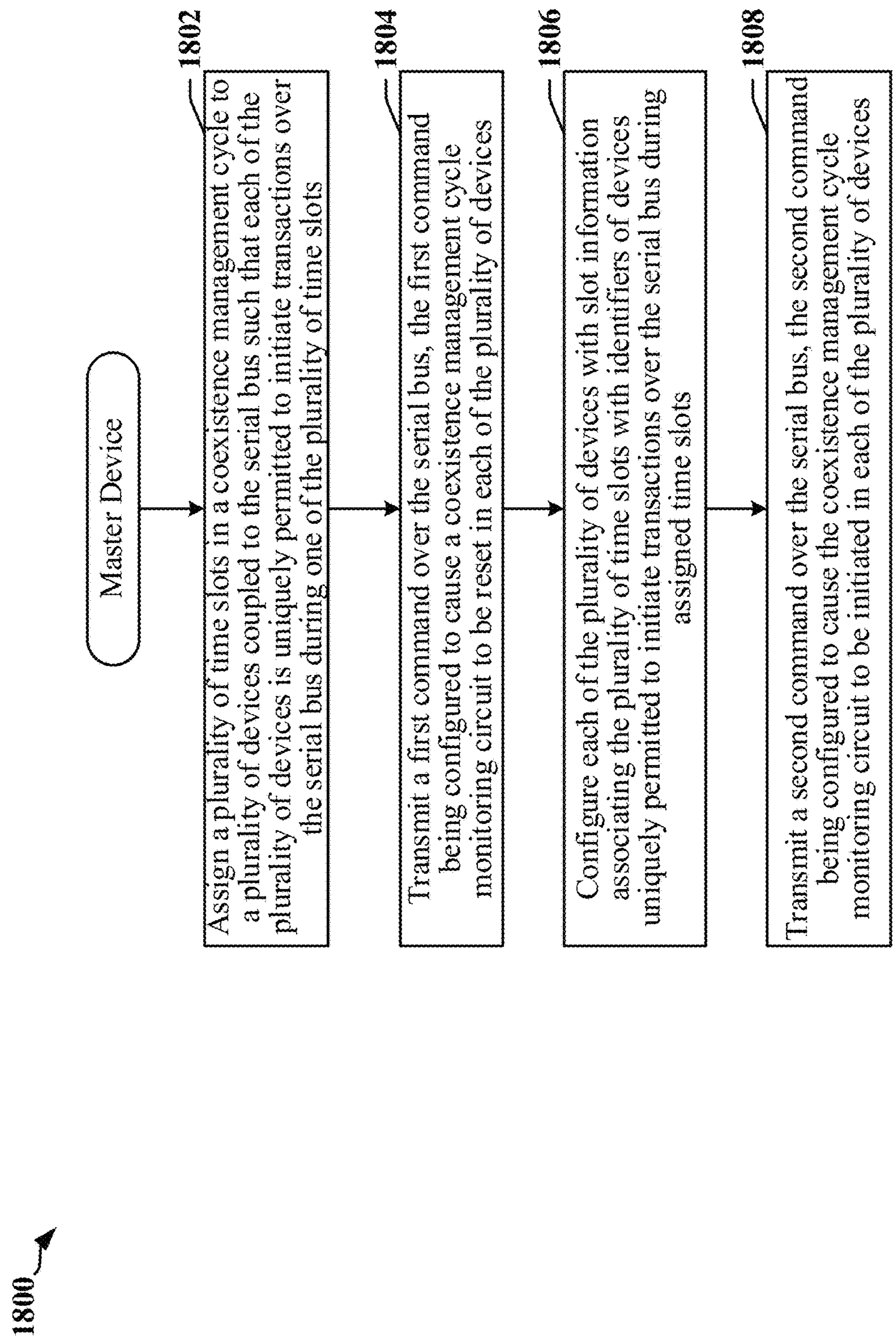
FIG. 18 is a third flowchart that illustrates certain aspects disclosed herein.

FIG. 18 is a flowchart 1800 of a method that may be performed by a master device coupled to a serial bus. In one example, the serial bus may be operated in accordance with SPMI specifications. In another example, the serial bus may be operated in accordance with RFFE specifications. At block 1802, the master device may assign a plurality of time slots in a coexistence management cycle to a plurality of devices coupled to the serial bus such that each of the plurality of devices is uniquely permitted to initiate transactions over the serial bus during one of the plurality of time slots. At block 1804, the master device may transmit a first command over the serial bus. The first command may be configured to cause a coexistence management cycle monitoring circuit to be reset in each of the plurality of devices. At block 1806, the master device may configure each of the plurality of devices with slot information associating the plurality of time slots with identifiers of devices uniquely permitted to initiate transactions over the serial bus during assigned time slots. At block 1808, the master device may transmit a second command over the serial bus. The second command may be configured to cause the coexistence management cycle monitoring circuit to be initiated in each of the plurality of devices.

In one example, each time slot in the plurality of time slots has a duration that is defined by the period of a real time clock signal or a sleep clock signal received independently of the serial bus. Each time slot may repeat at a rate defined by the number of time slots included in the coexistence management cycle.

In one example, the master device may configure one or more arbitrable time slots in the coexistence management cycle. More than one device coupled to the serial bus may be permitted to initiate transactions during the one or more arbitrable time slots.

In one example, the slot information associates the one or more slots within the coexistence management cycle with information characterizing radio frequency interfaces in devices that are uniquely permitted to initiate transactions over the serial bus during assigned time slots.

In one example, each of the plurality of devices is configured to transmit coexistence management information in a corresponding assigned time slot. The coexistence management information may be transmitted in accordance with an SPMI protocol, RFFE protocol or another protocol.

Figure 19:
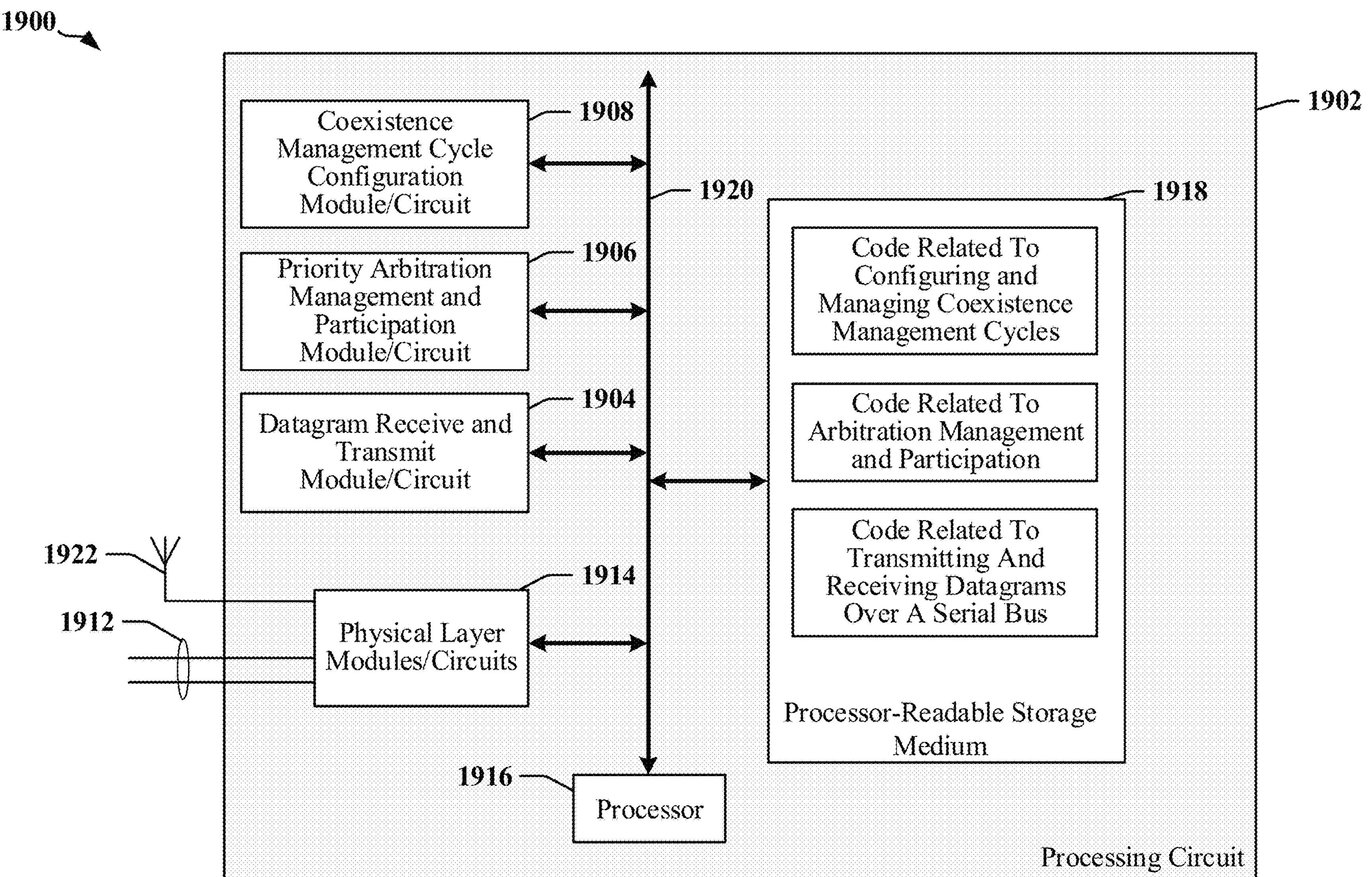
FIG. 19 illustrates a second example of a hardware implementation for an apparatus adapted in accordance with certain aspects disclosed herein.

FIG. 19 is a diagram illustrating a simplified example of a hardware implementation for an apparatus 1900 employing a processing circuit 1902. The processing circuit typically has a controller or processor 1916 that may include one or more microprocessors, microcontrollers, digital signal processors, sequencers and/or state machines. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the controller or processor 1916, the modules or circuits 1904, 1906 and 1908 and the processor-readable storage medium 1918. One or more physical layer circuits and/or modules 1914 may be provided to support communication over a communication link implemented using a multi-wire bus 1912, through an antenna or antenna array 1922 (to a radio access network for example), and so on. The bus 1920 may also link various other circuits such as timing sources, peripherals, voltage regulators, and power management circuits, which are well known in the art, and therefore, will not be described any further.

The processor 1916 is responsible for general processing, including the execution of software, code and/or instructions stored on the processor-readable storage medium 1918. The processor-readable storage medium 1918 may include a non-transitory storage medium. The software, when executed by the processor 1916, causes the processing circuit 1902 to perform the various functions described supra for any particular apparatus. The processor-readable storage medium 1918 may be used for storing data that is manipulated by the processor 1916 when executing software. The processing circuit 1902 further includes at least one of the modules 1904, 1906 and 1908. The modules 1904, 1906 and 1908 may be software modules running in the processor 1916, resident/stored in the processor-readable storage medium 1918, one or more hardware modules coupled to the processor 1916, or some combination thereof. The modules 1904, 1906 and 1908 may include microcontroller instructions, state machine configuration parameters, or some combination thereof.

In one configuration, the apparatus 1900 includes modules and/or circuits 1908 adapted to configure, and/or operate coexistence management cycles, modules and/or circuits 1906 adapted to manage and/or participate in priority arbitration procedures, and modules and/or circuits 1904 adapted to configure, conduct and/or participate in transactions over the multi-wire bus 1912 configured to operate according to SPMI or RFFE specifications and protocols.

In certain implementations, the apparatus 1900 includes physical layer circuits and/or modules 1914 that implement an interface circuit adapted to couple the apparatus 1900 to the multi-wire bus 1912. The apparatus 1900 may have a processor 1916 configured to assign a plurality of time slots in a coexistence management cycle to a plurality of devices coupled to the serial bus such that each of the plurality of devices is uniquely permitted to initiate transactions over the serial bus during one of the plurality of time slots, transmit a first command through the interface circuit, the first command being configured to cause a coexistence management cycle monitoring circuit to be reset in each of the plurality of devices, configure each of the plurality of devices with slot information associating the plurality of time slots with identifiers of devices uniquely permitted to initiate transactions over the serial bus during assigned time slots, and transmit a second command through the interface circuit, the second command being configured to cause the coexistence management cycle monitoring circuit to be initiated in each of the plurality of devices.

In one example, each time slot in the plurality of time slots has a duration that is defined by the period of a real time clock signal or a sleep clock signal received independently of the serial bus. Each time slot may repeat at a rate defined by the number of time slots included in the coexistence management cycle.

In one example, the processor 1916 is configured to provide one or more arbitrable time slots in the coexistence management cycle. More than one device coupled to the serial bus may be permitted to initiate transactions during the one or more arbitrable time slots.

In one example, the slot information associates the one or more slots within the coexistence management cycle with information characterizing radio frequency interfaces in devices that are uniquely permitted to initiate transactions over the serial bus during assigned time slots.

In one example, each of the plurality of devices is configured to transmit coexistence management information in a corresponding assigned time slot. The coexistence management information may be transmitted in accordance with an SPMI protocol, RFFE protocol or another protocol.

The processor-readable storage medium 1918 may include transitory or non-transitory storage devices configured to store code, instructions and/or parameters used to implement one or more methods or procedures disclosed herein. The processor-readable storage medium 1918 may include code for assigning a plurality of time slots in a coexistence management cycle to a plurality of devices coupled to the serial bus such that each of the plurality of devices is uniquely permitted to initiate transactions over the serial bus during one of the plurality of time slots, transmitting a first command over the serial bus, the first command being configured to cause a coexistence management cycle monitoring circuit to be reset in each of the plurality of devices, configuring each of the plurality of devices with slot information associating the plurality of time slots with identifiers of devices uniquely permitted to initiate transactions over the serial bus during assigned time slots, and transmitting a second command over the serial bus, the second command being configured to cause the coexistence management cycle monitoring circuit to be initiated in each of the plurality of devices.

In one example, each time slot in the plurality of time slots has a duration that is defined by the period of a real time clock signal or a sleep clock signal received independently of the serial bus. Each time slot may repeat at a rate defined by the number of time slots included in the coexistence management cycle.

In one example, the processor-readable storage medium 1918 may include code for assigning one or more arbitrable time slots in the coexistence management cycle. More than one device coupled to the serial bus may be permitted to initiate transactions during the one or more arbitrable time slots.

In one example, the slot information associates the one or more slots within the coexistence management cycle with information characterizing radio frequency interfaces in devices that are uniquely permitted to initiate transactions over the serial bus during assigned time slots.

In one example, each of the plurality of devices is configured to transmit coexistence management information in a corresponding assigned time slot. The coexistence management information may be transmitted in accordance with an SPMI protocol, RFFE protocol or another protocol.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of data communication at a first device coupled to a serial bus, comprising:

receiving a clock signal independently of the serial bus, wherein the clock signal is provided to each device coupled to the serial bus;

monitoring a coexistence management cycle that includes a plurality of time slots defined with reference to the clock signal, each time slot in the plurality of time slots being configured to have a duration sufficient to carry at least one coexistence message;

transmitting a first coexistence message in a first datagram over the serial bus without bus arbitration during a first time slot in the plurality of time slots, wherein the first device is uniquely permitted to initiate transactions over the serial bus during the first time slot, and wherein the first coexistence message signals that an imminent radio frequency (RF) transmission to be initiated by the first device is capable of causing damage to one or more other devices coupled to the serial bus;

participating in an arbitration procedure by initiating transmission of a unique address corresponding to the first device over the serial bus during a second time slot in the plurality of time slots, wherein more than one device coupled to the serial bus is permitted to initiate transactions during the second time slot, wherein one or more devices participating in the arbitration procedure are configured to concurrently transmit their corresponding unique addresses over the serial bus, and wherein the first device wins the arbitration procedure when other devices participating in the arbitration procedure have corresponding unique addresses that are associated with lower priorities than a priority associated with the unique address corresponding to the first device;

transmitting a second coexistence message in a second datagram over the serial bus during the second time slot after winning the arbitration procedure; and refraining from initiating a transaction during a third time slot in the plurality of time slots, wherein a second device is uniquely permitted to initiate transactions over the serial bus during the third time slot.

2. The method of claim 1, wherein the duration of each time slot in the plurality of time slots is defined by cycle time of the clock signal, and wherein each time slot repeats at a rate defined by a number of time slots included in the coexistence management cycle.

3. The method of claim 1, wherein the clock signal is provided by a clock source coupled to each device that is coupled to the serial bus.

4. The method of claim 3, wherein the clock signal comprises a real time clock signal or a sleep clock signal.

5. The method of claim 1, further comprising:

receiving a third datagram in a fourth time slot in the plurality of time slots; and identifying a transmitter of the third datagram based on position of the fourth time slot within the coexistence management cycle.

6. The method of claim 1, further comprising:
maintaining slot information associating one or more time slots within the coexistence management cycle with identifiers of each device uniquely permitted to initiate transactions over the serial bus during one of the one or more time slots.

7. The method of claim 6, further comprising:
receiving the slot information from a master device while the coexistence management cycle is disabled;
receiving a start command from the master device that initiates the coexistence management cycle; and
commencing monitoring of the coexistence management cycle after receiving the start command.

8. The method of claim 6, wherein the slot information associates the one or more time slots within the coexistence management cycle with information characterizing radio frequency interfaces in each device uniquely permitted to initiate transactions over the serial bus during the one or more time slots.

9. The method of claim 1, further comprising:
transmitting a third coexistence message in a third datagram over the serial bus without bus arbitration during a fourth time slot in the plurality of time slots, wherein the first device is uniquely permitted to initiate transactions over the serial bus during the fourth time slot, and wherein the third coexistence message signals that an imminent action by the first device is capable of causing RF interference in at least one other device coupled to the serial bus.

10. The method of claim 1, wherein the first datagram is transmitted in accordance with a System Power Management Interface (SPMI) protocol.

11. An apparatus for data communication comprising:
an interface circuit adapted to couple the apparatus to a serial bus;
a slot counter configured to monitor a coexistence management cycle that includes a plurality of time slots defined with reference to a clock signal received independently of the serial bus, each time slot in the plurality of time slots being configured to have a duration sufficient to carry at least one coexistence message, wherein the clock signal is provided to each device coupled to the serial bus; and
a processor configured to:
transmit a first coexistence message in a first datagram through the interface circuit without bus arbitration during a first time slot in the plurality of time slots, wherein the apparatus is uniquely permitted to initiate transactions over the serial bus during the first time slot, and wherein the first coexistence message signals that an imminent RF transmission to be initiated by the apparatus is capable of causing damage to one or more other devices coupled to the serial bus;
participate in an arbitration procedure by initiating transmission of a unique address corresponding to the apparatus over the serial bus during a second time slot in the plurality of time slots, wherein more than one device coupled to the serial bus is permitted to initiate transactions during the second time slot, wherein two or more devices participating in the arbitration procedure are configured to concurrently transmit their corresponding unique addresses over the serial bus, and wherein the apparatus wins the arbitration procedure when other devices participating in the arbitration procedure have corresponding unique addresses that are associated with lower priorities than a priority associated with the unique address corresponding to the apparatus;
transmit a second coexistence message in a second datagram over the serial bus during the second time slot after winning the arbitration procedure; and
refrain from initiating a transaction during a third time slot in the plurality of time slots, wherein a second device is uniquely permitted to initiate transactions over the serial bus during the third time slot.

12. The apparatus of claim 11, wherein the duration of each time slot in the plurality of time slots is defined by cycle time of the clock signal, and wherein each time slot repeats at a rate defined by a number of time slots included in the coexistence management cycle.

13. The apparatus of claim 11, wherein the processor is further configured to:
provide the clock signal to the slot counter, wherein the clock signal is provided by a clock source coupled to each device that is coupled to the serial bus.

14. The apparatus of claim 13, wherein the clock signal comprises a real time clock signal or a sleep clock signal.

15. The apparatus of claim 11, wherein the processor is further configured to:
receive a third datagram through the interface circuit during a fourth time slot in the plurality of time slots; and
identify a transmitter of the third datagram based on position of the fourth time slot within the coexistence management cycle.

16. The apparatus of claim 11, wherein the processor is further configured to:
maintain slot information associating one or more time slots within the coexistence management cycle with identifiers of each device uniquely permitted to initiate transactions over the serial bus during one of the one or more time slots.

17. The apparatus of claim 16, wherein the processor is further configured to:
receive the slot information from a master device while the coexistence management cycle is disabled;
receive a start command from the master device that initiates the coexistence management cycle by clearing the slot counter; and
commence monitoring of the coexistence management cycle after receiving the start command.

18. The apparatus of claim 16, wherein the slot information associates the one or more time slots within the coexistence management cycle with information characterizing radio frequency interfaces in each device uniquely permitted to initiate transactions over the serial bus during the one or more time slots.

19. The apparatus of claim 11, wherein the processor is further configured to:
transmit a third coexistence message in a third datagram over the serial bus without bus arbitration during a fourth time slot in the plurality of time slots, wherein the apparatus is uniquely permitted to initiate transactions over the serial bus during the fourth time slot, and wherein the third coexistence message signals that an imminent action by the apparatus is capable of causing RF interference in at least one other device coupled to the serial bus.

20. The apparatus of claim 11, wherein the first datagram is transmitted in accordance with a System Power Management Interface (SPMI) protocol.

21. A method of data communication at a master device coupled to a serial bus, comprising:

receiving a clock signal independently of the serial bus, wherein the clock signal is provided to each device coupled to the serial bus;

assigning a plurality of time slots in a coexistence management cycle to a plurality of devices coupled to the serial bus such that each of the plurality of devices is uniquely permitted to initiate transactions over the serial bus during one of the plurality of time slots, wherein the plurality of time slots is defined with reference to the clock signal with each time slot in the plurality of time slots being configured to have a duration sufficient to carry at least one coexistence message, and wherein certain time slots are configured to carry coexistence messages indicating imminent actions by corresponding devices coupled to the serial bus that are capable of causing radio frequency (RF) interference in at least one other device coupled to the serial bus;

transmitting a first command over the serial bus, the first command being configured to cause a coexistence management cycle monitoring circuit to be reset in each of the plurality of devices;

configuring each of the plurality of devices with slot information associating the plurality of time slots with identifiers of devices uniquely permitted to initiate transactions over the serial bus during assigned time slots; and transmitting a second command over the serial bus, the second command being configured to cause the coexistence management cycle monitoring circuit to be initiated in each of the plurality of devices, wherein for each occurrence of the coexistence management cycle:

a first device in the plurality of devices is uniquely permitted to initiate transactions over the serial bus without bus arbitration during a first time slot, the first device is configured to refrain from initiating a transaction during a second time slot, a second device in the plurality of devices is uniquely permitted to initiate transactions over the serial bus without bus arbitration during the second time slot, and the first device and the second device are configured to initiate transactions during a third time slot after winning an arbitration procedure within the third time slot in which the first device and the second device concurrently transmit their corresponding unique addresses over the serial bus, wherein the first device wins the arbitration procedure when the second device has a corresponding unique address associated with a lower priority than a priority associated with a corresponding unique address of the first device, and wherein the first device is configured to use the first time slot of an occurrence of the coexistence management cycle to transmit messages that signal when an imminent RF transmission to be initiated by the first device is capable of causing damage to one or more other devices coupled to the serial bus.

22. The method of claim 21, wherein the duration of each time slot in the plurality of time slots is defined by a period of a real time clock signal or a sleep clock signal, and wherein each time slot repeats at a rate defined by a number of time slots included in the coexistence management cycle.

23. The method of claim 21, further comprising:

configuring one or more arbitrable time slots in the coexistence management cycle, including the third time slot, wherein more than one device coupled to the serial bus is permitted to initiate transactions during the one or more arbitrable time slots.

24. The method of claim 21, wherein the slot information associates the plurality of time slots within the coexistence management cycle with information characterizing radio frequency interfaces in devices that are uniquely permitted to initiate transactions over the serial bus during assigned time slots.

25. The method of claim 21, wherein each of the plurality of devices is configured to transmit coexistence management information in a corresponding assigned time slot, and wherein the coexistence management information is transmitted in accordance with a System Power Management Interface (SPMI) protocol.

26. An apparatus for data communication comprising:

an interface circuit adapted to couple the apparatus to a serial bus; and a processor configured to:

assign a plurality of time slots in a coexistence management cycle to a plurality of devices coupled to the serial bus such that each of the plurality of devices is uniquely permitted to initiate transactions over the serial bus during one of the plurality of time slots, wherein the plurality of time slots is defined with reference to a clock signal received independently of the serial bus, wherein the clock signal is provided to each device coupled to the serial bus, wherein each time slot in the plurality of time slots is configured to have a duration sufficient to carry at least one coexistence message, and wherein certain time slots are configured to carry coexistence messages indicating imminent actions by corresponding devices coupled to the serial bus that are capable of causing radio frequency (RF) interference in at least one other device coupled to the serial bus;

transmit a first command through the interface circuit, the first command being configured to cause a coexistence management cycle monitoring circuit to be reset in each of the plurality of devices;

configure each of the plurality of devices with slot information associating the plurality of time slots with identifiers of devices uniquely permitted to initiate transactions over the serial bus during assigned time slots; and transmit a second command through the interface circuit, the second command being configured to cause the coexistence management cycle monitoring circuit to be initiated in each of the plurality of devices, wherein for each occurrence of the coexistence management cycle:

a first device in the plurality of devices is uniquely permitted to initiate transactions over the serial bus without bus arbitration during a first time slot, the first device is configured to refrain from initiating a transaction during a second time slot, a second device in the plurality of devices is uniquely permitted to initiate transactions over the serial bus without bus arbitration during the second time slot, and the first device and the second device are configured to initiate transactions during a third time slot after winning an arbitration procedure within the third time slot in which the first device and the second device concurrently transmit their corresponding unique addresses over the serial bus, wherein the first device wins the arbitration procedure when the second device has a corresponding unique address associated with a lower priority than a priority associated with a corresponding unique address of the first device, and wherein the first device is configured to use the first time slot of an occurrence of the coexistence management cycle to transmit messages that signal when an imminent RF transmission to be initiated by the first device is capable of causing damage to one or more other devices coupled to the serial bus.

27. The apparatus of claim 26, wherein the duration of each time slot in the plurality of time slots is defined by a period of a real time clock signal or a sleep clock signal, and wherein each time slot repeats at a rate defined by a number of time slots included in the coexistence management cycle.

28. The apparatus of claim 26, wherein the processor is further configured to:

configure one or more arbitrable time slots in the coexistence management cycle, including the third time slot, wherein more than one device coupled to the serial bus is permitted to initiate transactions during the one or more arbitrable time slots.

29. The apparatus of claim 26, wherein the slot information associates the plurality of time slots within the coexistence management cycle with information characterizing radio frequency interfaces in devices that are uniquely permitted to initiate transactions over the serial bus during assigned time slots.

30. The apparatus of claim 26, wherein each of the plurality of devices is configured to transmit coexistence management information in a corresponding assigned time slot, and wherein the coexistence management information is transmitted in accordance with a System Power Management Interface (SPMI) protocol.

* * * * *